US011362545B2

(12) United States Patent
Sieber et al.

(10) Patent No.: US 11,362,545 B2
(45) Date of Patent: Jun. 14, 2022

(54) HYBRID FOREIGN-OBJECT DETECTION AND POSITIONING SYSTEM

(71) Applicant: WiTricity Corporation, Watertown, MA (US)

(72) Inventors: Lukas Sieber, Olten (CH); Hans Peter Widmer, Wohlenschwil (CH); Andreas Daetwyler, Muhen (CH)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 17/192,066

(22) Filed: Mar. 4, 2021

(65) Prior Publication Data
US 2021/0194294 A1 Jun. 24, 2021

Related U.S. Application Data

(63) Continuation of application No. 16/052,445, filed on Aug. 1, 2018, now Pat. No. 10,944,300.
(Continued)

(51) Int. Cl.
*H02J 50/60* (2016.01)
*G01V 3/10* (2006.01)
(Continued)

(52) U.S. Cl.
CPC .............. *H02J 50/60* (2016.02); *B60L 53/12* (2019.02); *G01V 3/101* (2013.01); *H02J 50/10* (2016.02); *H02J 50/90* (2016.02)

(58) Field of Classification Search
CPC . H02J 50/10; H02J 50/60; H02J 50/90; B60L 53/12; G01V 3/10
(Continued)

(56) References Cited

U.S. PATENT DOCUMENTS

| 10,944,300 B2 | 3/2021 | Sieber et al. |
| 2011/0053500 A1 | 3/2011 | Menegoli et al. |

(Continued)

FOREIGN PATENT DOCUMENTS

| CN | 104885327 | 9/2015 |
| CN | 106371143 | 2/2017 |
| WO | 2019055150 | 3/2019 |

OTHER PUBLICATIONS

"International Preliminary Report on Patentability", PCT Application No. PCT/US2018/045043, dated Apr. 2, 2020, 13 pages.
(Continued)

*Primary Examiner* — Hal Kaplan
(74) *Attorney, Agent, or Firm* — Colby Nipper PLLC

(57) ABSTRACT

An apparatus is disclosed for a hybrid foreign-object detection and position system. In an example aspect, a foreign object detection (FOD) system of the base power-transfer system detects a passive beacon of an electric vehicle power-transfer system based on a beacon loop of the passive beacon overlapping an array of FOD sense loops effective to cause a change in impedance or admittance of one or more of the FOD sense loops. In aspects, the impedance reflects a modulation signal from the passive beacon. A position detection system integrated with the FOD system determines a passive beacon response in the input data based on the modulation frequency from the passive beacon. Then, a position of the beacon loop is determined relative to the array of FOD sense loops using a result of the passive beacon response canceled from input data.

22 Claims, 23 Drawing Sheets

Related U.S. Application Data

(60) Provisional application No. 62/619,418, filed on Jan. 19, 2018, provisional application No. 62/596,611, filed on Dec. 8, 2017, provisional application No. 62/579,047, filed on Oct. 30, 2017, provisional application No. 62/560,005, filed on Sep. 18, 2017.

(51) Int. Cl.
*B60L 53/12* (2019.01)
*H02J 50/90* (2016.01)
*H02J 50/10* (2016.01)

(58) Field of Classification Search
USPC .................................. 307/9.1, 10.1
See application file for complete search history.

(56) References Cited

U.S. PATENT DOCUMENTS

| | | |
|---|---|---|
| 2015/0109000 A1 | 4/2015 | Sieber et al. |
| 2015/0255994 A1 | 9/2015 | Kesler et al. |
| 2016/0187519 A1 | 6/2016 | Widmer et al. |
| 2016/0318413 A1 | 11/2016 | Roehrl et al. |
| 2019/0089206 A1 | 3/2019 | Sieber et al. |
| 2020/0039368 A1* | 2/2020 | Sieber .................. B60L 53/124 |

OTHER PUBLICATIONS

"International Search Report and Written Opinion", PCT Application No. PCT/US2018/045043, dated Oct. 18, 2019, 22 pages.

"Non-Final Office Action", U.S. Appl. No. 16/052,445, filed May 7, 2020, 10 Pages.

"Notice of Allowance", U.S. Appl. No. 16/052,445, filed Nov. 3, 2020, 9 pages.

"Foreign Office Action", CN Application No. 201880070021.7, dated Jan. 6, 2022, 20 pages.

* cited by examiner

HYBRID FOREIGN-OBJECT DETECTION AND POSITIONING SYSTEM

RELATED APPLICATIONS

This application is a continuation of and claims priority to U.S. Utility application Ser. No. 16/052,445 filed on Aug. 1, 2018, which in turn claims the benefit of and priority to U.S. Provisional Appl. Ser. No. 62/619,418 filed on Jan. 19, 2018, U.S. Provisional Appl. Ser. No. 62/596,611 filed on Dec. 8, 2017, U.S. Provisional Appl. Ser. No. 62/579,047 filed on Oct. 30, 2017, and U.S. Provisional Appl. Ser. No. 62/560,005 filed on Sep. 18, 2017, the disclosures of which are incorporated herein by reference in their entirety.

TECHNICAL FIELD

This disclosure generally relates to wireless power. More specifically, this disclosure is directed to devices, systems, and methods related to aligning an electric vehicle with a wireless power-transfer system using a foreign object detection system.

BACKGROUND

Wireless power-transfer systems may differ in many aspects including circuit topologies, magnetics layout, and power-transmission capabilities or requirements. The amount of power transferred and the efficiency of the power transfer between components of a wireless power-transfer system may depend on the alignment between a transmitter power-transfer system of the wireless power-transfer system and a receiver power-transfer system of an electric vehicle. Wireless power-transfer systems may benefit from alignment systems.

SUMMARY

Aspects of the disclosure include a beacon subsystem for a hybrid foreign-object detection and position system. In particular, a passive beacon is integrated into an electric vehicle for interaction with a foreign object detection system of a wireless power-transfer system. This provides guidance and positioning information corresponding to the electric vehicle relative to an inductive power-transfer system of the wireless power-transfer system.

In an example aspect, a wireless-power receiver apparatus is disclosed. The apparatus includes a wireless-power receive circuit and a passive beacon circuit. The wireless-power receive circuit comprises an inductive power transfer coil configured to wirelessly couple power via a magnetic field generated by a transmitter coil. The power receive circuit is configured to provide the coupled power to power or charge a load. The passive beacon circuit comprises a beacon loop electrically connected to a capacitor to form a resonant circuit. The resonant circuit is electrically connected to a transistor configured to modulate an impedance state of the passive beacon circuit in response to a modulation control signal.

In an example aspect, a method for providing positioning signaling using a hybrid foreign-object detection and positioning system is disclosed. The method includes activating a passive beacon of a vehicle power-transfer system of an electric vehicle. The passive beacon comprises a resonant circuit including a beacon loop. The method further includes coupling a beacon loop of the passive beacon with one or more foreign object detection (FOD) sense loops of a FOD system in a base power-transfer system, the resonant circuit is configured to resonate based on a magnetic field generated by each of the one or more FOD sense loops. The method also includes modulating a resonance of the beacon loop at a modulation frequency to provide a passive beacon signal that is detectable by the FOD system.

In an example aspect, a power-transfer system is disclosed. The power-transfer system comprises a foreign object detection (FOD) system configured to detect both foreign objects and a passive beacon of an electric vehicle power-transfer system. The FOD system is configured to detect the passive beacon based on characteristic changes in impedance or admittance of one or more of an array of FOD sense loops in response to a modulation of the passive beacon. The power-transfer system also includes a position detection system integrated with the FOD system and configured to determine a passive beacon response in the input data based on a modulation frequency of the modulation of the passive beacon. The position detection system is further configured to cancel the passive beacon response from the input data. The FOD system is configured to detect whether the foreign objects are present based on the input data with the passive beacon response canceled. The position detection system is also configured to determine a position of a beacon loop of the passive beacon relative to the array of FOD sense loops based on the passive beacon response.

In an example aspect, a method for detecting presence and position of a passive beacon is disclosed. The method includes generating input data based on characteristic changes in impedance or admittance of one or more foreign object detection (FOD) sense loops of an array of FOD sense loops of a FOD system in response to a modulation of the passive beacon. The method further includes determining a passive beacon response in the input data of the FOD system based on a modulation frequency of the modulation of the passive beacon. The method also includes canceling the passive beacon response from the input data. The method further detecting whether foreign objects are present based on the input data with the passive beacon response canceled. In addition, the method includes determining a position of a beacon loop of the passive beacon relative to the array of FOD sense loops based on the passive beacon response.

DETAILED DESCRIPTION

Figure 1:
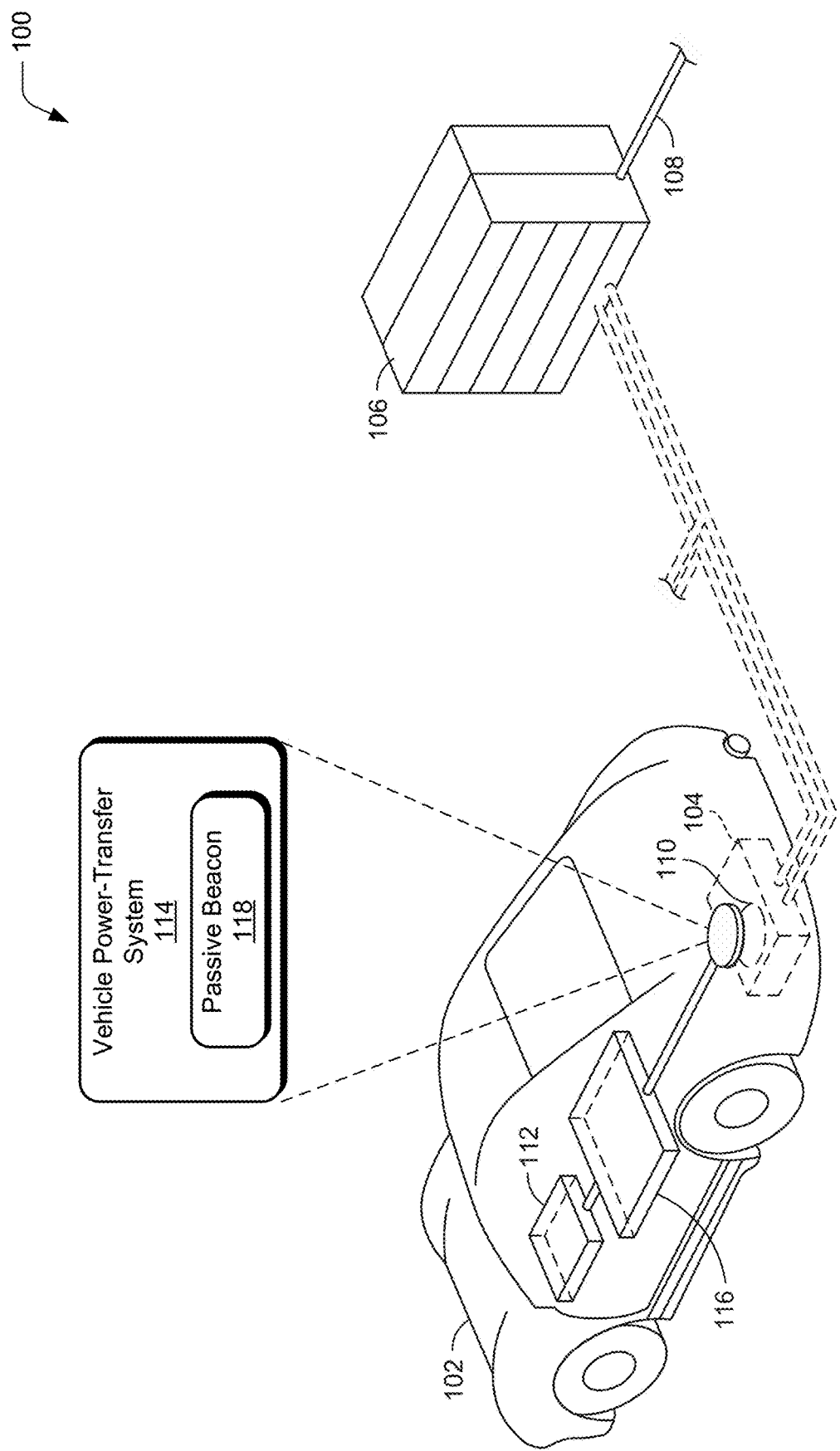
FIG. 1 illustrates an example wireless power-transfer system, which enables charging of an electric vehicle while the electric vehicle is stationary so as to efficiently couple with a transmitter.

Misalignment between a vehicle power-transfer system and a base power-transfer system can negatively affect efficiency of power transfer to the electric vehicle.

A short-range positioning system for an electric vehicle (EV) is disclosed herein. In aspects, the short-range positioning system uses existing foreign object detection (FOD) systems in conjunction with a passive beacon in the vehicle power-transfer system to determine the position of the vehicle power-transfer system relative to the base power-transfer system. Position information can be made available to a driver of the EV using a graphical representation and/or audible signals or used in an autonomous positioning system in a vehicle. In at least some aspects, position information can be computed to an area covered by the FOD system, such as an area corresponding to the base power-transfer system.

A beacon loop analog frontend (AFE) including a means for passive modulation is disclosed herein. In aspects, the beacon loop AFE is integrated into the vehicle power-transfer system. The beacon loop AFE can be used to create a passive beacon signal that can be detected based on FOD by inducing an impedance change or admittance change in sense loops of the FOD system. In an aspect, the beacon loop AFE is not driven with a signal, but a switch is used to cause the beacon loop AFE to act as a resonator to create a modulation observed as varying electrical characteristics (e.g., impedance or admittance characteristics) at sense loops of the FOD system. When the beacon loop AFE is resonating due to FOD fields generated at a coil (e.g., sense loop), the beacon loop AFE can be detected as a special metal object because of the modulation. For example, an FOD system using sense loops is configured to detect the presence of inadvertently positioned passive metal foreign objects (e.g., a coin). Presence of these inadvertent metal objects is detected based on interaction of the metal objects with fields generated by the sense loops which, for example, changes the impedance at sense loops, which can then be detected. The beacon loop AFE behaves as a passive metal object to the FOD system as well. However, the beacon loop AFE is configured to be altered between at least two impedance states (e.g., resonant state and non-resonant state) to cause a predetermined response, such as two different responses, at the FOD sense loops at a frequency (e.g., effectively alternating between two different metal objects with different characteristics). The two states at the frequency allows the FOD system to characterize/recognize the object as the beacon loop AFE because the predetermined response at the FOD system is characteristic of the beacon loop AFE. Detecting the beacon loop AFE allows for determining positioning of the beacon loop AFE with respect to the FOD sense loops. In this way the FOD system can be leveraged to provide positioning between coils of the power transfer system whose positions are fixed relative to the FOD sense loops and the beacon loop AFE.

In aspects, the beacon loop AFE is configured as a resonant beacon loop. In an example, the resonant beacon loop can operate at approximately 3.0 MHz. Additionally, the resonance of the beacon loop AFE is allowed to toggle on and off at a predefined modulation frequency, such as 10.0 kHz. Any suitable frequency can be used, such as a frequency in the range of 1.0-20.0 kHz. A switch is used to toggle the resonance of the beacon loop AFE, which creates a resonant circuit in one state (e.g., ON state) and then a non-resonant circuit another state (e.g., OFF state). The resonant beacon loop is also configured to magnetically couple to the FOD sense loops at the base power-transfer system.

In addition, the beacon loop AFE is configured to coexist with an inductive power-transfer system. For instance, the beacon loop AFE is configured to sustain a certain voltage level at a certain frequency, such as 85 kHz (an example of a wireless charging frequency), induced into the beacon loop AFE itself as well as into control lines carrying a modulation control signal between the EV power supply and the vehicle power-transfer system.

Further, the size of the beacon loop AFE is sufficient to enable the beacon loop AFE to fit into the vehicle power-transfer system mechanically and without increasing in temperature in the presence of a strong magnetic field, such as an 85 kHz magnetic field (e.g., for wireless power transfer) with flux densities up to e.g., 10 mT. The beacon loop AFE is further configured to sustain high temperatures, such as e.g., 125° C.

In aspects, the beacon loop AFE is decoupled from an inductive power-transfer coil of the vehicle power-transfer system (e.g., magnetically decoupled where any voltage induced on the beacon loop AFE by the fields generated by the inductive-power transfer coils is reduced). This decoupling prevents the inductance of the beacon loop AFE from being shorted by a strong coupling that results in the inductive power-transfer coil's self-capacitance transforming into the beacon loop.

In further aspects, the beacon loop AFE is disposed in a center of a frequency band of the FOD system. In an example, the beacon loop AFE provides a resonance at about 3.0 MHz. The beacon loop AFE is also configured to allow passive modulation at modulation frequencies greater than 10 kHz. A ratio between an on-state and an off-state can be 30 dB, such that leakage current in the off-state is 30 dB below current in the on-state.

The beacon loop AFE has a quality (Q) factor that describes energy losses within the resonator. The Q-factor is controllable by assembly options. For instance, the Q-factor can be reduced to limit the FOD response created by the beacon loop. This adjustment can be beneficial for signal processing.

FIG. 1 illustrates an example wireless power-transfer system 100, which enables charging of an electric vehicle 102 while the electric vehicle 102 is stationary so as to efficiently couple with a transmitter 104. The electric vehicle 102 can be charged or powered in whole or in part using the wireless power-transfer system 100. Transmit circuitry 106 may be part of the transmitter 104. The transmit circuitry 106 may be coupled to a power backbone 108 (e.g., a power grid). The transmit circuitry 106 is configured to receive power from the power backbone 108. The transmitter 104 (which may also be referred to as a power transmitting circuit) may be coupled to the transmit circuitry 106 and configured to receive power from the transmit circuitry 106. The transmitter 104 may include at least one base power-transfer system 110 (e.g., a coil) coupled to the transmit circuitry 106. As shown in FIG. 1, the transmitter 104 may be located at or below the ground (as represented with dotted lines).

The electric vehicle 102 may include a battery unit 112, a vehicle power-transfer system 114, and an electric vehicle battery-charging system 116. The electric vehicle battery-charging system 116 and the vehicle power-transfer system 114 constitute the electric vehicle wireless charging system. The vehicle power-transfer system 114 may interact with the base power-transfer system 110, for example, based on resonant inductive coupling via a region of a magnetic field generated by the base power-transfer system 110. In some exemplary implementations, the vehicle power-transfer system 114 may receive power when the vehicle power-transfer system 114 is located in the magnetic field produced by the base power-transfer system 110.

The vehicle power-transfer system 114 may be positioned within a charging area of the base power-transfer system 110 to receive power. The electric vehicle battery-charging system 116 is configured to receive power from the vehicle power-transfer system 114. The electric vehicle battery-charging system 116 is configured to process the power received by the vehicle power-transfer system 114 to power or charge the battery unit 112.

The vehicle power-transfer system 114 is illustrated as including a passive beacon 118, such as a beacon loop AFE. In aspects, the passive beacon 118 is configured to enable guidance and positioning of the electric vehicle 102. The passive beacon 118 is configured to create detectable changes, such as impedance changes, in sense loops of an FOD system implemented at the base power-transfer system 110. Further details of this and other aspects are described below with reference to FIGS. 2-9.

Figure 2:
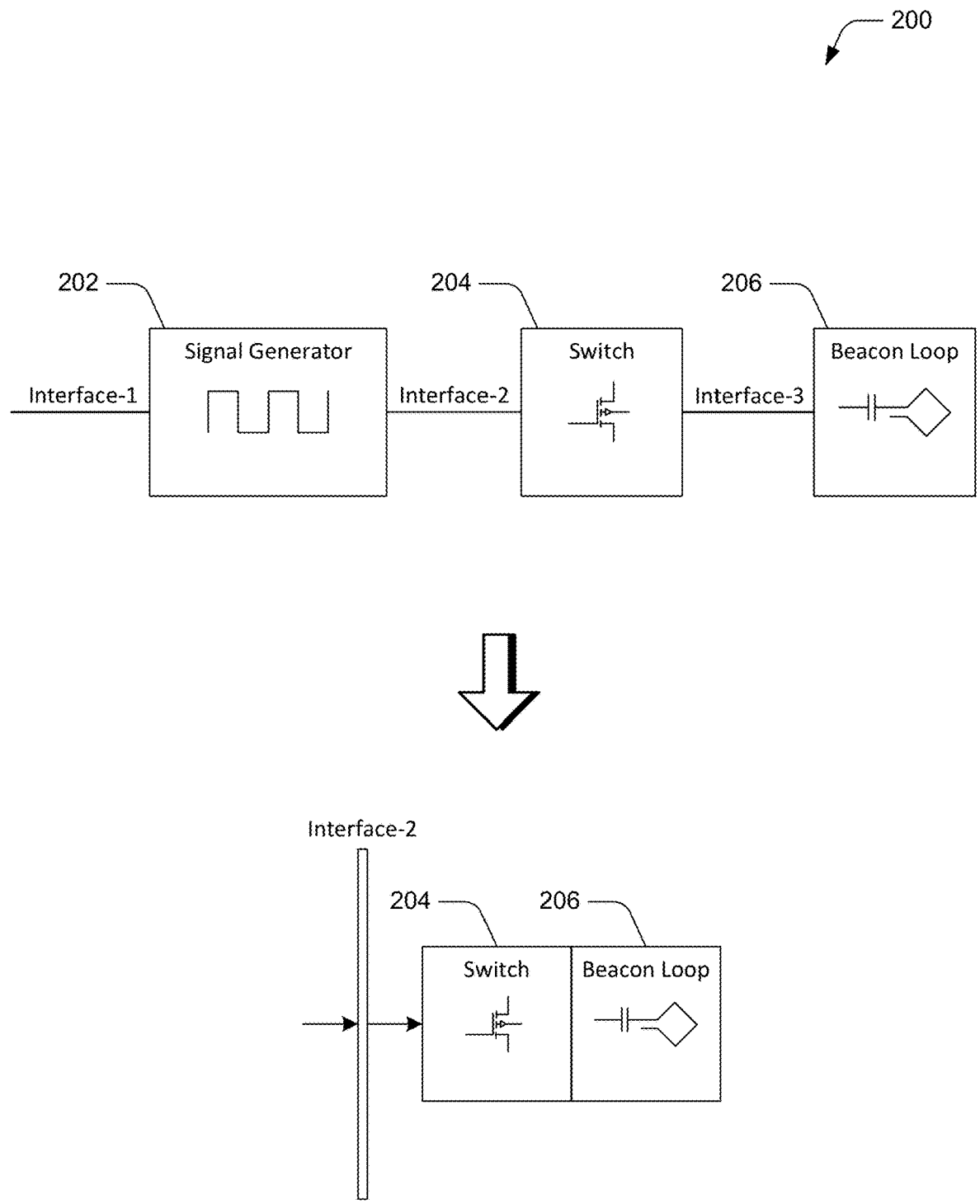
FIG. 2 illustrates an example implementation of a passive beacon system for integration into a wireless electric vehicle charging (WEVC) system.

FIG. 2 illustrates an example implementation 200 of a passive beacon system for integration into a wireless electric vehicle charging (WEVC) system. The passive beacon system of a wireless power-transfer system includes at least a modulation control signal generator 202, a passive modulation switch 204, and a resonant beacon loop 206.

In a wireless electric vehicle charging (WEVC) system, two physical units, an electric vehicle power supply (EVPS) and the vehicle power-transfer system 114, can be used to integrate the system. Even in a single-unit solution having the EVPS and the vehicle power-transfer system 114 integrated into a single device, different compartments may be used to separate high-voltage electronics from low-voltage electronics. Likewise, the passive beacon system hardware can be split between the EVPS and the vehicle power-transfer system 114. For instance, implementing the passive modulation switch 204 and a resonant beacon loop 206 at the vehicle power-transfer system 114 removes leads for a beacon signal, e.g., distance "Interface-3" has zero length as shown in the bottom image of FIG. 2. Advantages of this configuration include a lack of a considerable distance between the resonant beacon loop 206 and the passive modulation switch 204, paired with the use of minimal electronics in the vehicle power-transfer system 114, which reduces the cost and complexity of the system. The passive modulation switch 204 and the resonant beacon loop 206 are collectively referred to herein as the beacon loop AFE. In this implementation, the signal generator 202 can operate separately from the vehicle power-transfer system of the electric vehicle. In some aspects, the modulation control signal generator 202 generates a 10.0 kHz signal with a 50% duty cycle and an amplitude of 12 V.

Other implementations of the WEVC system hardware are also contemplated. For instance, implementing the modulation control signal generator 202, the passive modulation switch 204, and the resonant beacon loop 206 at the vehicle power-transfer system 114 may result in the resonant beacon loop being insensitive to noise because no long lead lines are used. However, this configuration may need a low voltage supply and a control signal to the vehicle power-transfer system 114 over a first distance "Interface-1". Including all three components in the vehicle power-transfer system 114 may be challenging with space constraints, and the electronics may experience an increase in temperature when exposed to strong magnetic fields, such as 85 kHz magnetic fields. Another implementation includes the modulation control signal generator 202 and the passive modulation switch 204 implemented at the EVPS, and the resonant beacon loop 206 implemented at the vehicle power-transfer system 114. This configuration includes only passive components at the vehicle power-transfer system 114, but the resonator may require leads, such as over distance "Interface-3".

Figure 3:
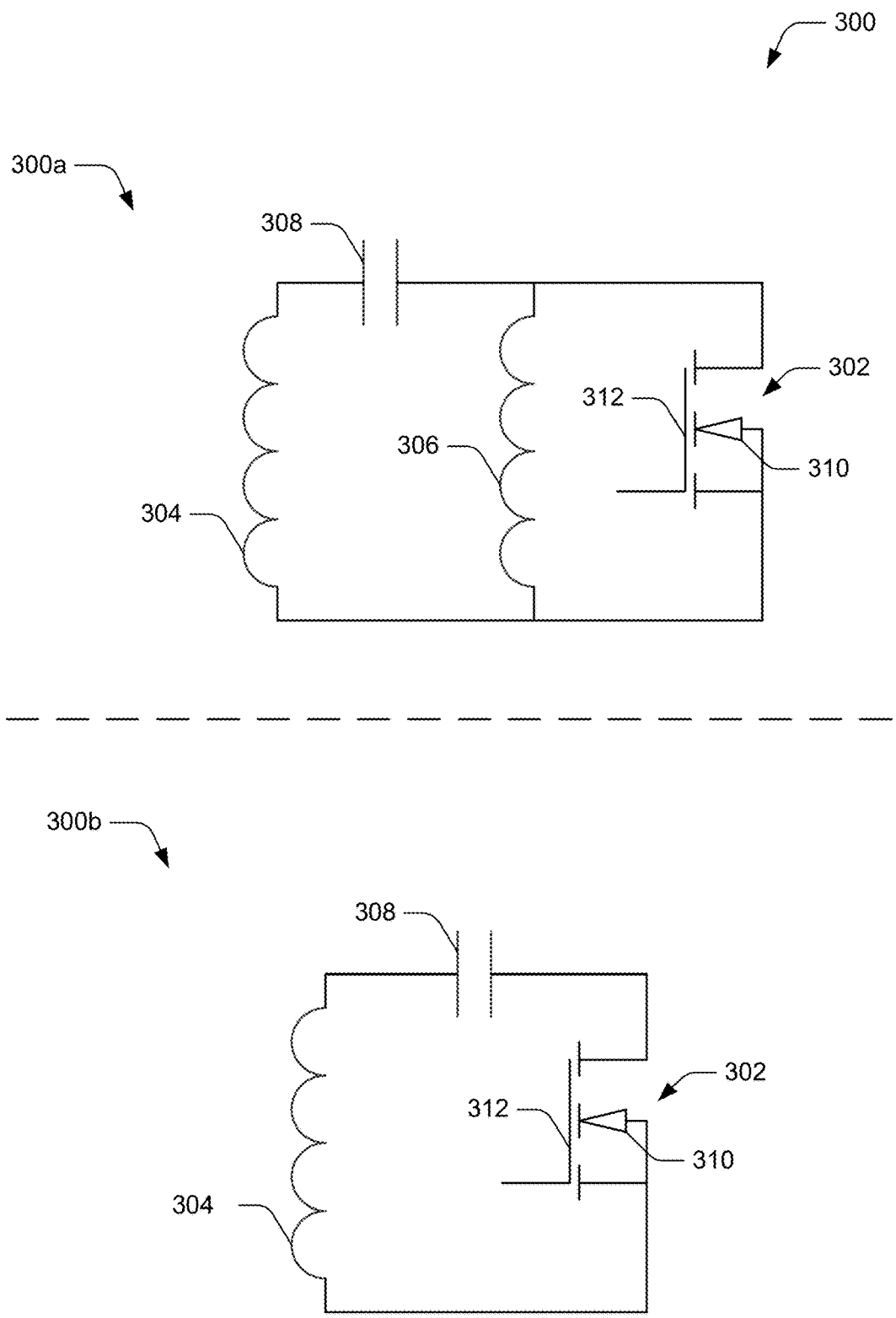
FIG. 3 illustrates example implementations of a beacon loop analog frontend.
Figure 4:
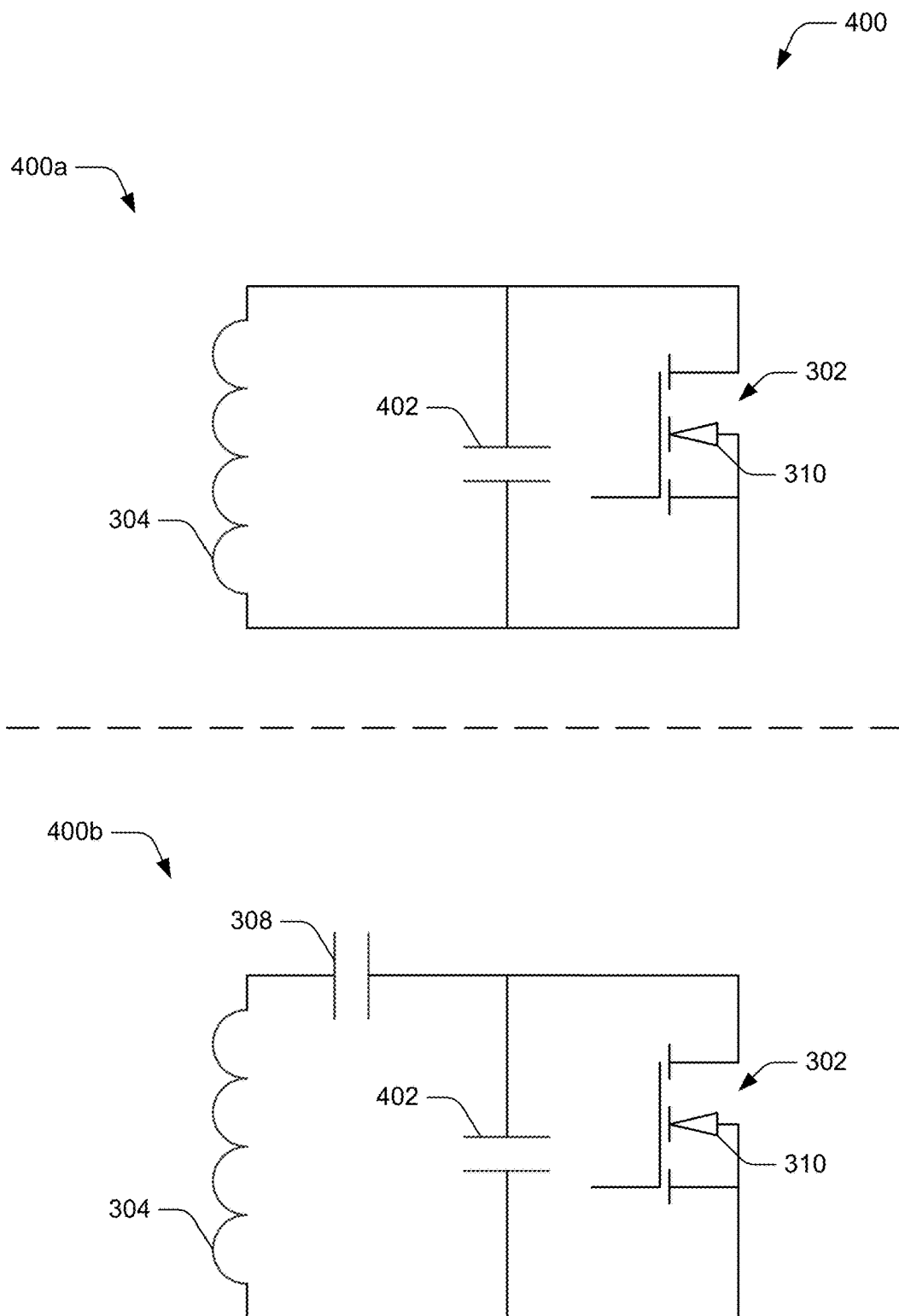
FIG. 4. illustrates example implementations of a beacon loop analog frontend.

FIG. 3 illustrates example implementations 300 of a beacon loop analog frontend (AFE). FIG. 4 illustrates additional implementations of a beacon loop AFE. The beacon loop AFE can be implemented as a resonator that is built as a series-resonant circuit (e.g., FIG. 3) or as a parallel-resonant circuit (e.g., FIG. 4). The resonator has an on/off ratio that defines the ratio of reflected impedance into the FOD sense loop when changing the beacon's state from on to off or vice versa on the beat of the modulating signal. A measured FOD response may be increased based on an increased on/off ratio.

Circuit 300a uses a shunt inductance to short circuit an induced magnetic field during active inductive power transfer. This allows for selection of a transistor 302 with relatively low voltage rating because substantially all induced low-frequency (LF) voltage is short circuited. The circuit 300a includes two inductors 304, 306 in parallel and in series with a capacitor 308. The transistor 302 is illustrated as an n-channel metal-oxide-semiconductor field-effect transistor (MOSFET) with a body diode 310 and gate 312. However, any suitable transistor may be utilized for the resonator.

Circuit 300b utilizes fewer inductors compared with circuit 300a, which allows the beacon loop AFE in circuit 300b to be cheaper and smaller. For example, circuit 300b includes inductor 304 in series with capacitor 308. The inductor 304 and the capacitor 308 are coupled to transistor 302. The transistor 302 may include body diode 310 and gate 312. If turned off, the transistor 302 may need to sustain the full induced voltage into the beacon loop, such as via inductor 304. But since the beacon loop is decoupled from the inductive power-transfer coil, the expected induced voltage is very low (in the order of several volts). Therefore, small signal transistors currently exist which are suitable to be used in such a configuration. Accordingly, the beacon loop AFE of circuit 300b is a simple circuit that may reduce cost of manufacture in comparison to traditional techniques.

Circuit 400a in FIG. 4 illustrates a parallel-resonant circuit with inductor 304 in parallel with capacitor 402 and coupled to transistor 302. This example implementation can include an acceptable on/off ratio because corresponding switch properties (e.g., non-zero output capacitance, non-zero on-resistance) are ideally absorbed. Instead, the resonant circuit in circuit 400a cannot be opened in case of inductive power transfer. Circuit 400b illustrates an example parallel-resonant circuit with an inductor 304 in parallel with capacitor 402 and in series with capacitor 308. Further, the inductor 304 and capacitor 308 are connected in series with transistor 302. Circuit 400b enables the switch to detune the circuit. However, the achievable on/off ratio is substantially reduced in comparison to circuit 400a, which may lead to a reduced FOD response and a lower signal-to-noise ratio (SNR) for a position calculation.

Apart from normal beacon operation during positioning, the beacon loop AFE (e.g., implementations 300 and 400 illustrated in FIGS. 3 and 4) is also configured to coexist with the active power transfer. In order to coexist with the active power transfer (e.g., in the presence of the magnetic field generated by the inductive power-transfer coil), the passive beacon AFE uses the body-diode 310 of the transistor 302 in the loop. This enables the circuit to act as a rectifier, which allows the resonance capacitor 308 to be loaded approximately to peak voltage of the signal and a peak-to-peak value of the induced voltage to be applied to the transistor 302.

In aspects, a Q-factor of the resonator governs FOD response and influences timing. As a result, the Q-factor governs the maximum usable modulation frequency.

Figure 5:
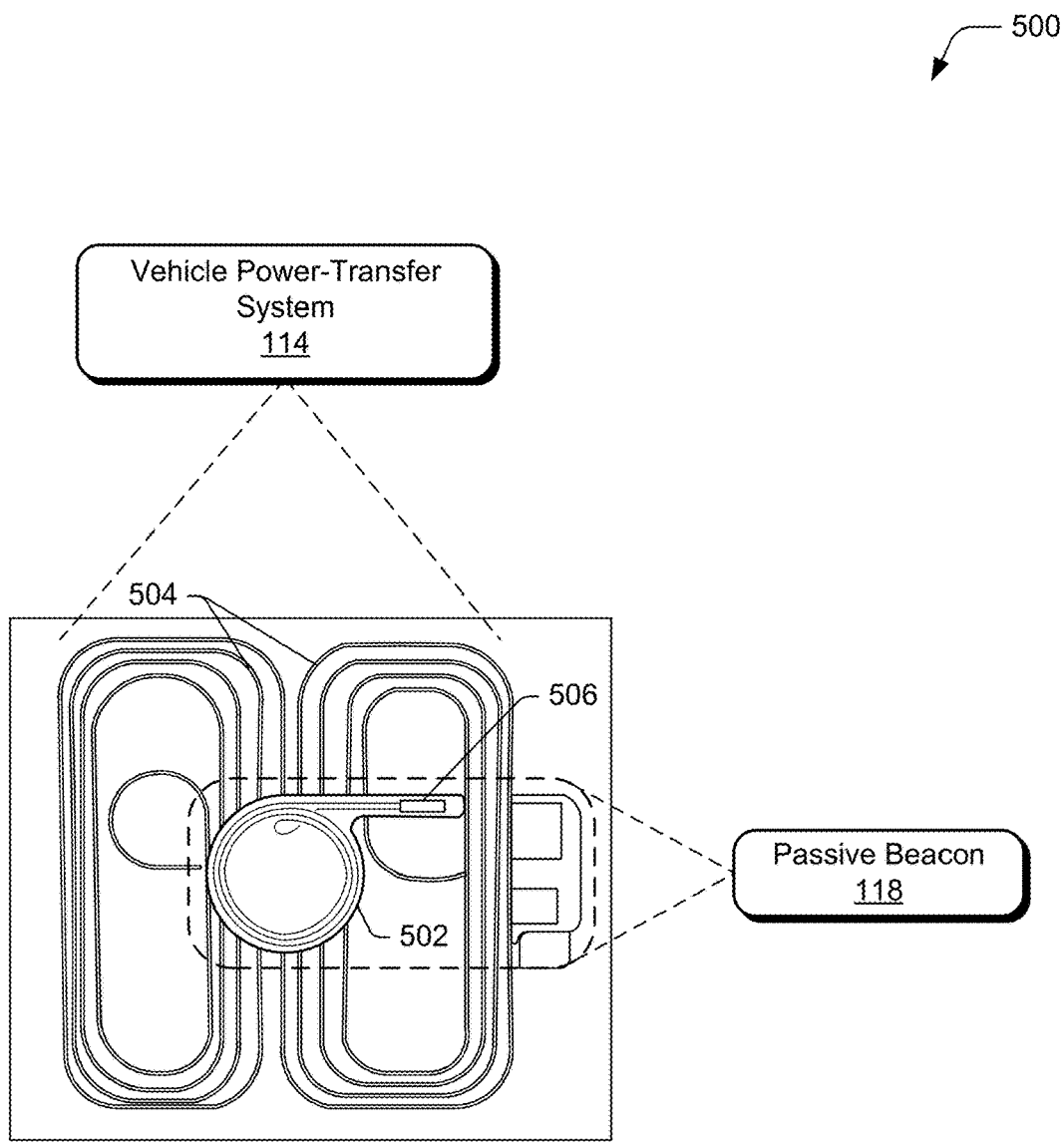
FIG. 5 illustrates an example of a passive beacon incorporated into a vehicle power-transfer system.

FIG. 5 illustrates an example 500 of a passive beacon incorporated into a vehicle power-transfer system, such as the vehicle power-transfer system 114. The passive beacon 118 includes an antenna/coil, such as beacon loop 502. The beacon loop 502 includes properties that govern performance of the passive beacon 118 and influence the design of the attached circuit. The beacon loop 502 includes a diameter, which can influence coupling to the FOD loops in relation to an operating distance range being supported, mechanical integration into the vehicle power-transfer system 114, inductance per turn, as well as induced voltage, such as an induced 85 kHz voltage. Using a larger loop may result in higher coupling to the FOD sense loops and consequently a higher FOD response. However, a larger loop may also couple to more FOD sense loops at once, which may result in a broader overall FOD response that may compromise position accuracy. Operating ranges, e.g., distance between the vehicle power-transfer system 114 and the base power-transfer system 110, can include a variety of ranges, examples of which include 50-100 mm, 100-160 mm, 120-200 mm, and so on.

Another property of the passive beacon 118 includes a loop structure. Loops can be built with their turns concentrated along the perimeter, or with the turns distributed, leading to a spiral-type loop. Loops with their turns concentrated along the perimeter may result in an increased Q-factor and coupling to the FOD sense loops, in comparison to loops with distributed turns. In aspects, a shape of the loop is circular, which can lead to rotation invariability of the system.

A beacon loop magnetically decoupled (orthogonal) from the inductive power-transfer coil results in a much higher FOD response magnitude, in comparison to beacon loops that are coupled to the inductive power-transfer coil. Depending on the inductive power-transfer coil and the coupling, FOD response may be eliminated completely.

Additionally, in some implementations the beacon loop is integrated between the ferrite and the inductive power-transfer coil (e.g., Litz wire), or between the coil and a plastic shell, e.g., housing. In aspects, the FOD response magnitude is much higher when the loop is placed between the coil and the plastic shell. This may be a result of the reduced distance between the passive beacon loop and the FOD sense loops, as well as by the increased distance between the passive beacon loop and ferrite in the vehicle power-transfer system 114.

In the illustrated example 500, the vehicle power-transfer system 114 includes an inductive power-transfer coil, such as double-D (DD) coil 504. The vehicle power-transfer system 114 also includes the beacon loop 502, which is a component of the passive beacon 118. In one implementation the beacon loop 502 is positioned near or at the center of the DD coil 504 to increase orthogonality with the DD coil 504. When the beacon loop 502 is orthogonal to the DD coil 504, a coupling factor between the beacon loop 502 and the DD coil 504 is reduced (e.g., to potentially close to zero) therefore the beacon loop 502 becomes independent (decoupled) from the DD coil 504. In aspects, the position, orientation, and coil structure of the beacon loop 502 is configured to achieve orthogonality. In general, orthogonality results in the magnetic field created by one coil canceling out in the other coil and vice versa (e.g., the magnetic flux generated by the DD coil 504 has a directionality such that little or no voltage is induced on the beacon loop 502 due to the magnetic flux). A center position of the beacon loop 502 also has the advantage of its position directly corresponding to a magnetic center of the vehicle power-transfer system 114. In principle, any suitable position can be used for the beacon loop 502, and a lateral or longitudinal offset can be corrected in software. Further, because the passive beacon cannot provide information about the vehicle rotation, such correction may lead to increased position error. In another implementation, multiple beacon loops may be included in the vehicle power-transfer system 114, or external to it, that can provide information about the vehicle rotation based on the positions of the multiple beacon loops relative to one another as well as the orientation of the vehicle. In such an implementation, lateral or longitudinal offsets can be calculated and corrected for each beacon loop. Accordingly, a direction between two beacon loops can correspond to the orientation of the vehicle, e.g., direction that the vehicle is facing.

The beacon loop 502 is positioned or oriented to be magnetically decoupled from the DD coil 504. For instance, the beacon loop 502 is positioned effective to cause the magnetic flux generated by one coil of the DD coil 504 to generate a reduced or zero voltage on the other coil of the DD coil 504, resulting in little or reduced mutual coupling between the beacon loop 502 and the DD coil 504. In another example, the inductive power-transfer coil in the electric vehicle can include a single circular coil, and one or more beacon loops are magnetically decoupled from the circular coil based on positioning and/or shape. For example, the beacon loops may have DD configurations, such that the beacon loops are decoupled relative to vertical magnetic flux and sensitive to horizontal magnetic flux.

Additionally, due to its size, the beacon loop 502 may fit well into a top cover (not shown) of a housing of the vehicle power-transfer system 114. In some aspects, circuitry 506 of the passive beacon 118 is disposed in a center opening of one "D" of the DD coil 504. This location generally has the lowest relative flux density and also has maximum space in a vertical direction to accommodate the height of the circuit components. Close to the Litz wire of the DD coil 504, for example, the vertical flux component may be strong and thus may have adverse effects on the circuitry 506. Another possible location to include the circuitry is the center of the beacon loop since the flux density produced by the coil is purely horizontal at this position.

Figure 6A:
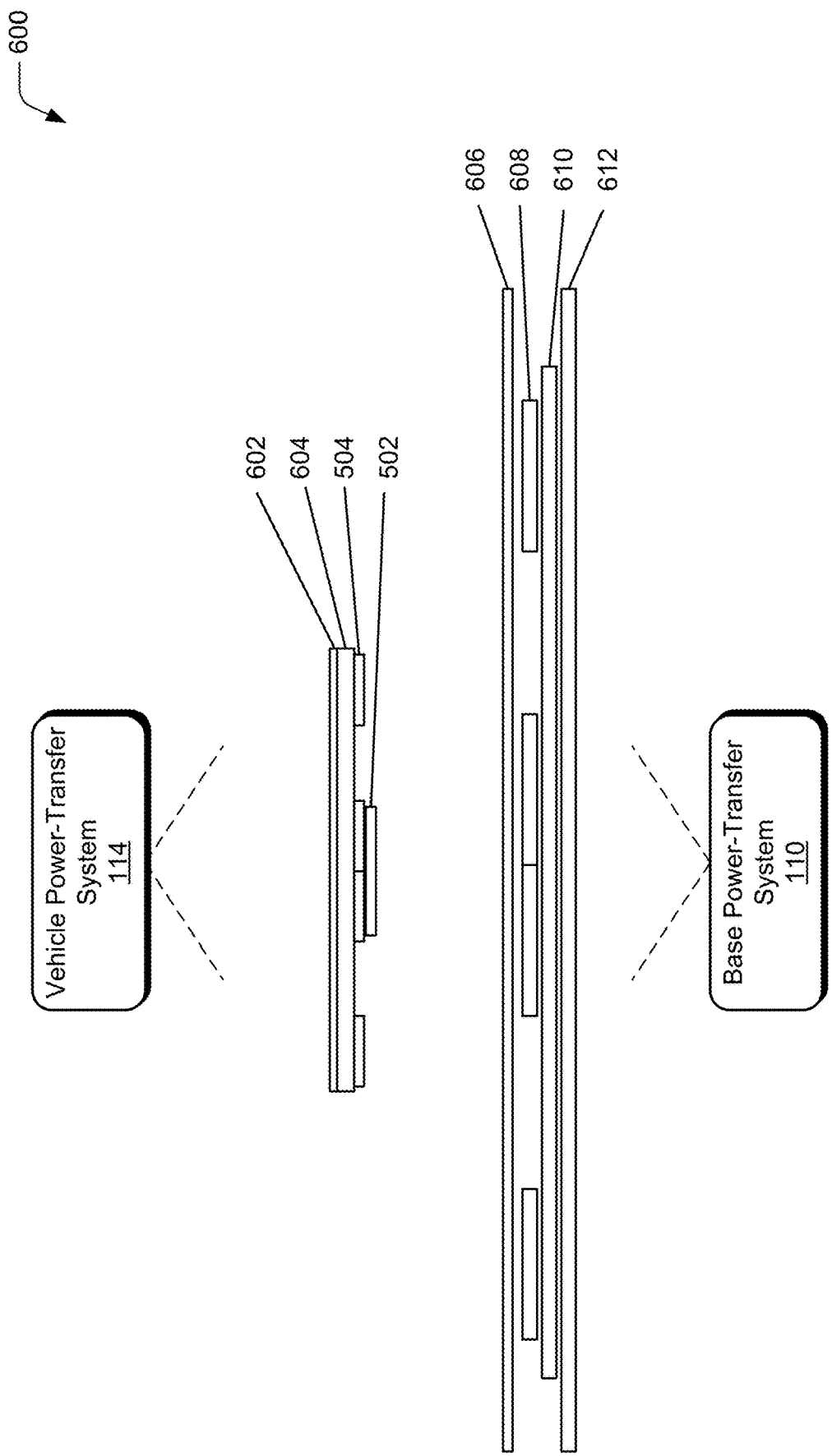
FIG. 6a illustrates an example layer structure of wireless electric vehicle charging (WEVC) magnetics with an integrated passive beacon and FOD loop array.

FIG. 6*a* illustrates an example layer structure 600 of wireless electric vehicle charging (WEVC) magnetics with an integrated passive beacon and a FOD loop array. The vehicle power-transfer system 114 is illustrated as including a backplate 602, ferrite 604, a DD coil 504, and a passive beacon loop 502. The backplate 602 is configured to shield components of the vehicle from a magnetic field induced by the base power-transfer system 110. The ferrite 604 is configured to channel magnetic flux of the magnetic field. The passive beacon loop 502 is configured to act as a resonator to create a modulation that is detectable by FOD sense loops in the base power-transfer system 110.

The base power-transfer system 110 is illustrated as including an FOD loop array 606, a DD coil 608, ferrite 610, and a backplate 612. The FOD loop array 606 includes a plurality of sense loops that detect a presence of foreign metal objects, including the passive beacon loop 502, above the base power-transfer system 110. The sense loops are configured to generate high-frequency magnetic fields that can interact with metal objects and create detectable changes, e.g., impedance, at the sense loops to be able to detect the metal objects. A position of the metal object or the passive beacon loop 502 relative to one or more sense loops in the FOD loop array 606 can be detected based on which of the sense loops experience the detectable change. For instance, when the passive beacon loop is positioned over the FOD loop array 606, one or more of the sense loops in the array may detect an impedance change and one or more other sense loops in the array may not detect any impedance change. As the passive beacon loop 502 moves over the FOD loop array 606, the impedance change in some of the sense loops may decrease or increase, providing an indication that the passive beacon loop 502 is moving toward an area corresponding to particular sense loops that are detecting the increased impedance change.

The overall resulting system structure may be symmetric in terms of the layer structure. The FOD loop array in the base power-transfer system 110 is integrated into a shell, e.g., housing, of the base power-transfer system 110. Likewise, the passive beacon loop in the vehicle power-transfer system 114 is integrated into a shell of the vehicle power-transfer system 114.

In an example, flux densities ($B_{RMS}$) in the vehicle power-transfer system 114 may exceed 10 $mT_{RMS}$ in specific locations close to the Litz wire of the inductive power-transfer coils. However, for an induced 85 kHz voltage into the passive beacon loop, the average flux density within the beacon loop area may be significant. As the beacon loop is decoupled from the inductive power-transfer coil, net flux through the beacon loop is substantially zero. However, in some instances, some net flux may result in the beacon loop due to asymmetries in the power-transfer system build-up as well as when charging occurs at maximum misalignment tolerance points. Turn count of the beacon loop coil is used to scale the inductance of the loop and therefore a resulting L/C-ratio (e.g., ratio of inductance over capacitance) and the Q-factor of the passive beacon loop 502.

Figure 6B:
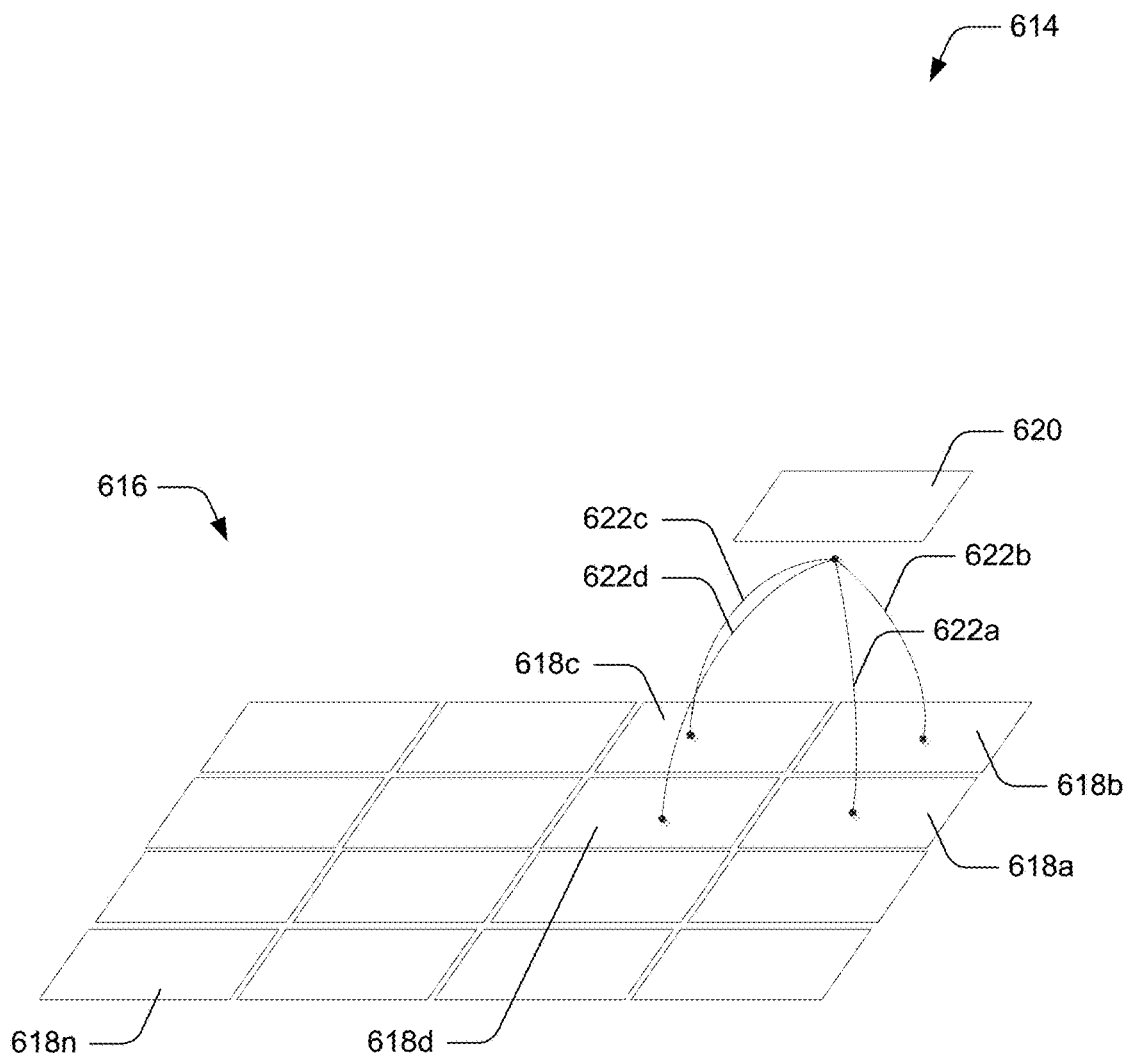
FIG. 6b illustrates an example implementation of at least a portion of a FOD loop array used to determine a relative position of a passive beacon on an electric vehicle.

FIG. 6*b* illustrates an example implementation 614 of at least a portion of a FOD loop array used to determine a relative position of a passive beacon on an electric vehicle. As illustrated, a FOD loop array 616 may comprise a plurality of sense coils 618*a*, 618*b* . . . 618*n* where "n" designates an arbitrary number of sense coils 618*a*, 618*b* . . . 618*n*, collectively hereinafter "618." Although only 16 sense coils 618 are specifically illustrated, aspects of the present application are not so limited. The FOD loop array 616 may comprise any number (two or greater) of sense coils 618. For example, the FOD loop array 616 may include 64 or more sense coils 618. The sensitivity of the FOD loop array 616 may be related to the number of sense coils 618 (e.g., the greater number of sense coils, 618 the greater the sensitivity of the FOD loop array 616). The arrangement of the sense coils 618 need not be a rectangular array, and may be any physical arrangement. Also shown in FIG. 6*b* is an object 620 positioned overtop of and relative to one or more of the sense coils 618. The object 620 can be a part of the electric vehicle 102 or a foreign object. As described below, the object 620 may be the same as or may comprise the passive beacon 118 of FIG. 1 detectable by the sense coils 618 to be indicative of the presence and/or position of the electric vehicle 102.

In an exemplary implementation, the FOD loop array 616 comprises a plurality of sense coils 618 configured to communicate with a controller to assist in aligning the vehicle power-transfer system 114 (of FIG. 1) with the base power-transfer system 110. The sense coils 618 are driven with an alternating current (AC) to generate an alternating field. When the object 620 is positioned within the field of one of the sense coils 618, a magnetic coupling is developed between the object 620 and the sense coil 618 (represented with lines 622*a*, 622*b*, 622*c*, and 622*d*, collectively referred to as coupling lines 622). Although only four coupling lines 622 are specifically illustrated, the object 620 may develop the magnetic coupling with any number (one or greater) of sense coils, in accordance with different embodiments. For example, the object 620 may at least be partially coupled to all of the sense coils 628. The presence of the object 620 causes a disturbance in the field generated by the sense coil 618 that is detectable by the particular sense coil 618. For example, the disturbance can be caused by a change in the impedance of the object 620 as sensed by one or more of the sense coils 618. As described above, each sense coil 618 is configured to communicate a detection signal to the controller indicative of the disturbance.

One non-limiting advantage of using more than one sense coil 618 is that the location of the object 620 can be determined based on detection signals. For example, the object 620 may be positioned at least partially above four sense coils 618*a-d*, thereby coupling to at least the sense coils 618*a-d*. As described above, the presence of the object 620 within the sense area of each sense coil 618*a-d* causes a disturbance in the field generated by each sense coil 618. As the object 620 moves relative to, for example, the sense coil 618a, the disturbance generates a response (e.g., a change in the complex impedance of the sense coil 618a) sensed or detected by the sense coil 618a changes. The change in the sensed response may be a change in the strength in the sensed response indicative of the change in the strength or magnitude of the disturbance. For example, as the object 620 moves closer to the sense coil 618a, the magnitude disturbance increases such that the strength of the sensed response (e.g., the sensed complex impedance due to the object 620) increases. As another example, as the object 620 moves farther away from the sense coil 618d, the magnitude of the sensed response detected by the sense coil 618d decreases. In any case, if the magnetic disturbance originates from the passive beacon, it contains the characteristic modulation (e.g., at 10 kHz) and therefore can be associated with the beacon.

Figure 7:
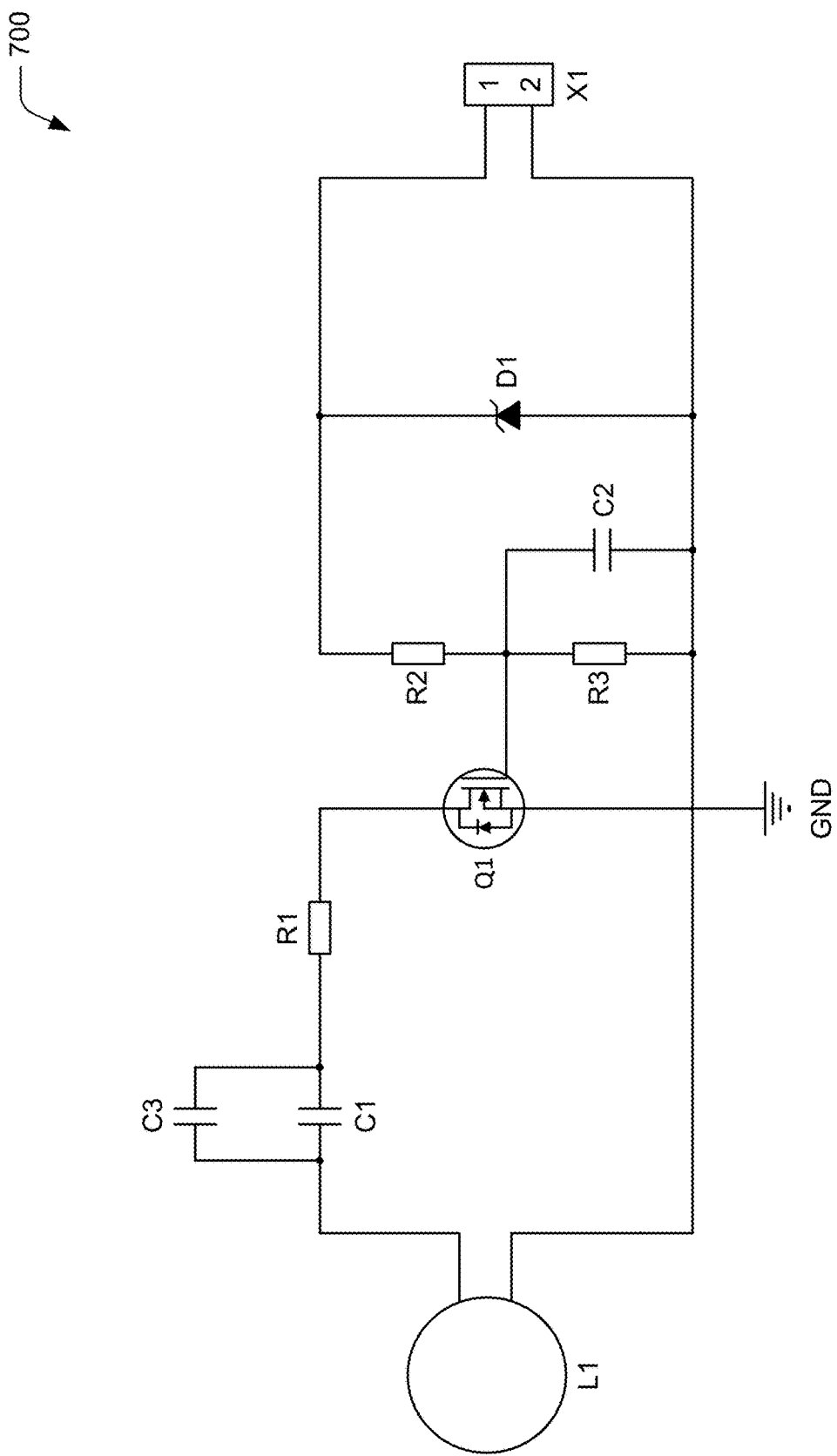
FIG. 7 illustrates an example schematic of a passive beacon loop analog front end integrated in a vehicle power-transfer system.

FIG. 7 illustrates an example schematic 700 of a passive beacon loop AFE integrated in a vehicle power-transfer system. The passive modulation switch 204 from FIG. 2 is controlled by the modulation control signal generator 202 from FIG. 2 via a twisted pair cable connecting the EVPS and the vehicle power-transfer system 114. On this interface, noise and interference immunity is maintained at an elevated state to prevent accidental turn-on of the passive modulation switch. Although not fatal (the passive modulation can be activated during power transfer), a single accidental turn-on might trigger an FOD false alarm. To achieve immunity to noise and interference, the passive beacon AFE is configured to handle high gate threshold voltage of the passive modulation switch, a raised input voltage level, a low-impedance input requiring some level of drive power, and low-pass filtering.

The example schematic 700 illustrates a loop L1 (e.g., inductor such as inductor 304 in FIGS. 3 and 4) connected in series to a capacitor C1 (e.g., capacitor 308). An additional capacitor C3 can be implemented in parallel with the capacitor C1 to reduce some of the load on the capacitor C1. Further, the capacitor C1 can be connected in series to a resistor R1. The loop L1 and capacitor C1 (and in some implementations, the resistor R1) are connected in series to a switch Q1 and ground GND. On the opposite side of the switch Q1, the illustrated circuit includes a resistor R2 connected in parallel with a resistor R3 and capacitor C2, such that the resistor R3 is parallel with the capacitor C2. In addition, a diode D1 is connected in parallel to resistors R2 and R3 and capacitor C2. Additional components may be further connected to the diode D1, the resistors R2 and R3, and the capacitor C2, such as a voltage source supplying a power supply X1.

In the illustrated example, an input voltage level is designed for nominal voltage by adding a resistive divider, such as resistors R2, R3. With a gate threshold voltage, such as 2.9 V, a switch Q1, such as the passive modulation switch 204 of FIG. 2, is turned on at an input voltage, such as an input voltage of 5 V. The current required to drive the input to this example threshold is 4.7 mA. In this example, the first order filter built by the resistive divider and capacitor C2 has a corner frequency of 27 kHz, which leads to a suppression of 10 dB at 85 kHz. At the operating frequency of 10 kHz, the filter imposes 0.5 dB suppression. The switch Q1 represents a transistor (e.g., transistor 302 from FIG. 3) with a body diode (e.g., body diode 310), that enables the circuit to act as a rectifier based on the resonance capacitor (e.g., capacitor C1) being loaded to approximately a peak voltage of the signal and the peak-to-peak value of an induced voltage being applied to the transistor. The body diode of the transistor allows current to flow through it only if the induced voltage exceeds the forward breakover point of the body diode. In this way, the circuit acts as a rectifier.

For impulsive noise and high voltage spikes on the line, a transient voltage suppression (TVS) diode, such as diode D1, is used as a clipper to protect the gate of the switch Q1 from excessive voltage that could damage the switch Q1. Resistor R1 may be optionally included to actively control the resonator Q-factor. In scenarios where the FOD response needs to be limited, resistor R1 can be used to tailor the beacon to a specific Z-gap. In aspects, the Q-factor may be dampened by using a transistor with a higher $R_{DSon}$.

The components illustrated in FIG. 7 are integrated into the vehicle power-transfer system 114 of FIG. 1. Thus, they may be exposed to increased flux densities. To reduce possible heating or induced voltages into the circuit, the passive components are built small. For instance, in the layout, a large loop between the gate of the transistor, resistor R3 and ground may induce voltage directly at the gate of the transistor. This induced voltage can be avoided, however, by building a small loop between the gate of the transistor, resistor R3 and ground. To prevent leads between the beacon coil and the circuitry from adding area to the coil area, the leads run parallel with minimum opening.

Aspects of the beacon loop AFE include loop size, which can be adjusted depending on the required operating distance range, e.g., distance between the base power-transfer system 110 and the vehicle power-transfer system 114, to be supported. However, a large loop, such as 80 mm diameter, can support multiple operating distance ranges. In addition, the beacon loop can be magnetically decoupled from the inductive power-transfer coil based on position or orientation, or both. For a DD vehicle power-transfer system, this can be achieved by placing the beacon loop in the magnetic (and physical) center of the DD coil. This also has an advantage for the position calculation as on offset needs to be factored in, leading to minimal position error.

Additional aspects of the beacon loop AFE include the L/C ratio that is optimized for low impact of adjacent dielectric materials as well as a high Q-factor. The transistor of the beacon loop AFE is configured to act as a passive modulation switch, and may include a low output capacitance, e.g., 1.0-4.0 pF, to support a large on/off ratio of the beacon loop. In addition, the transistor may include increased maximum breakdown voltage as it is stressed with peak-to-peak voltage of the 85 kHz during inductive power-transfer operation.

Electronics of the beacon loop AFE are physically small to fit into the vehicle power-transfer system 114 and to minimize heating effects during inductive power transfer, e.g., in the presence of high flux density. In addition, the beacon loop AFE includes a resonance capacitor, such as the resonance capacitor 308 of FIG. 3, that can sustain the peak voltage of the 85 kHz signal induced during inductive power transfer.

Figure 8:
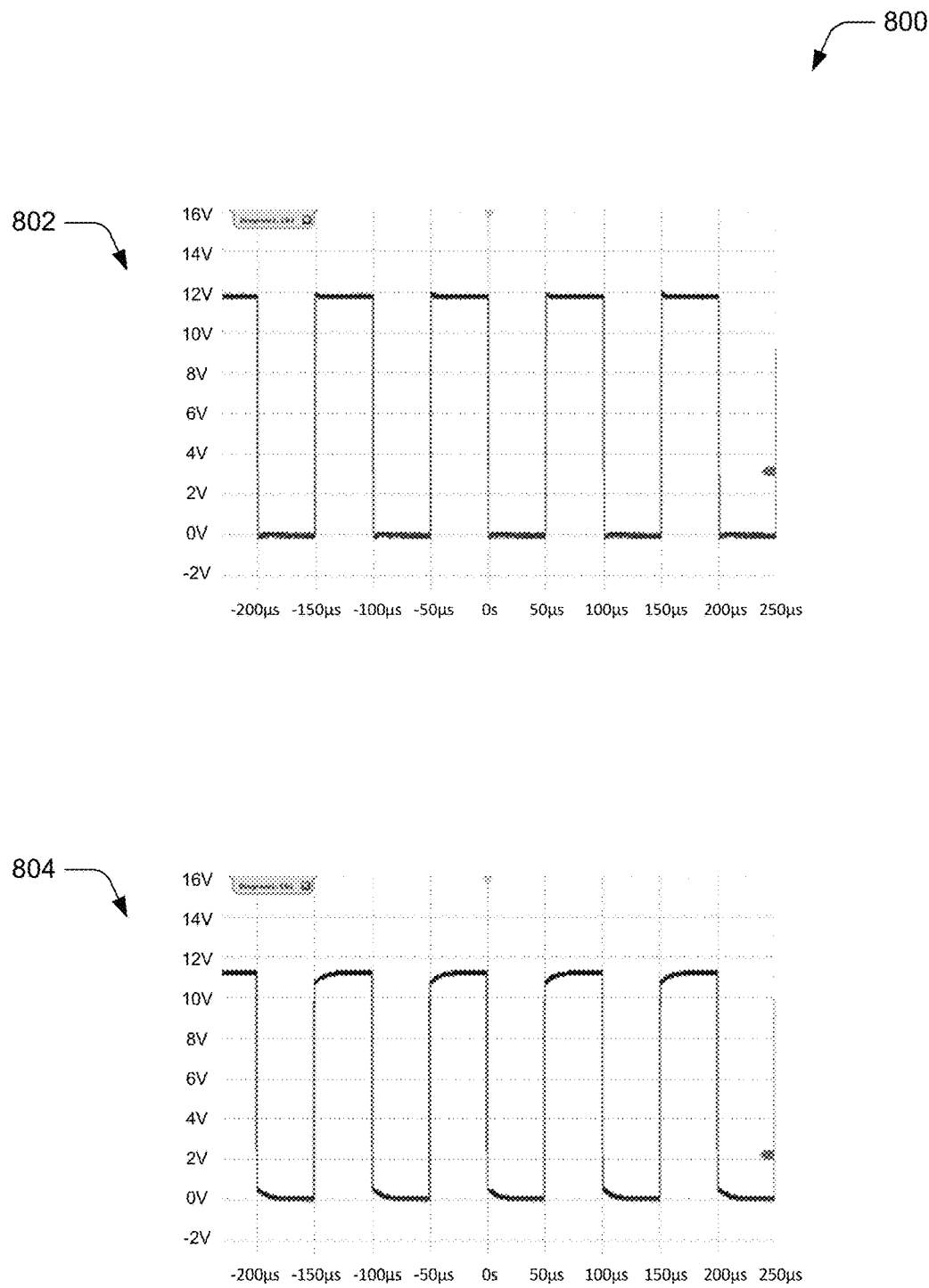
FIG. 8 illustrates example waveforms along a main signal path of a beacon subsystem for a hybrid foreign-object detection and positioning system.

FIG. 8 illustrates example waveforms 800 along a main signal path of a beacon subsystem for a hybrid foreign-object detection and positioning system. Waveform 802 illustrates a low side driver output with the beacon loop AFE not connected. In comparison, waveform 804 shows a low side driver output with the beacon loop AFE connected. With the beacon loop AFE connected, the driver output gets loaded with the input filter of the beacon loop AFE board. The transistor on the beacon loop AFE switches at about 5 V input voltage.

Figure 9:
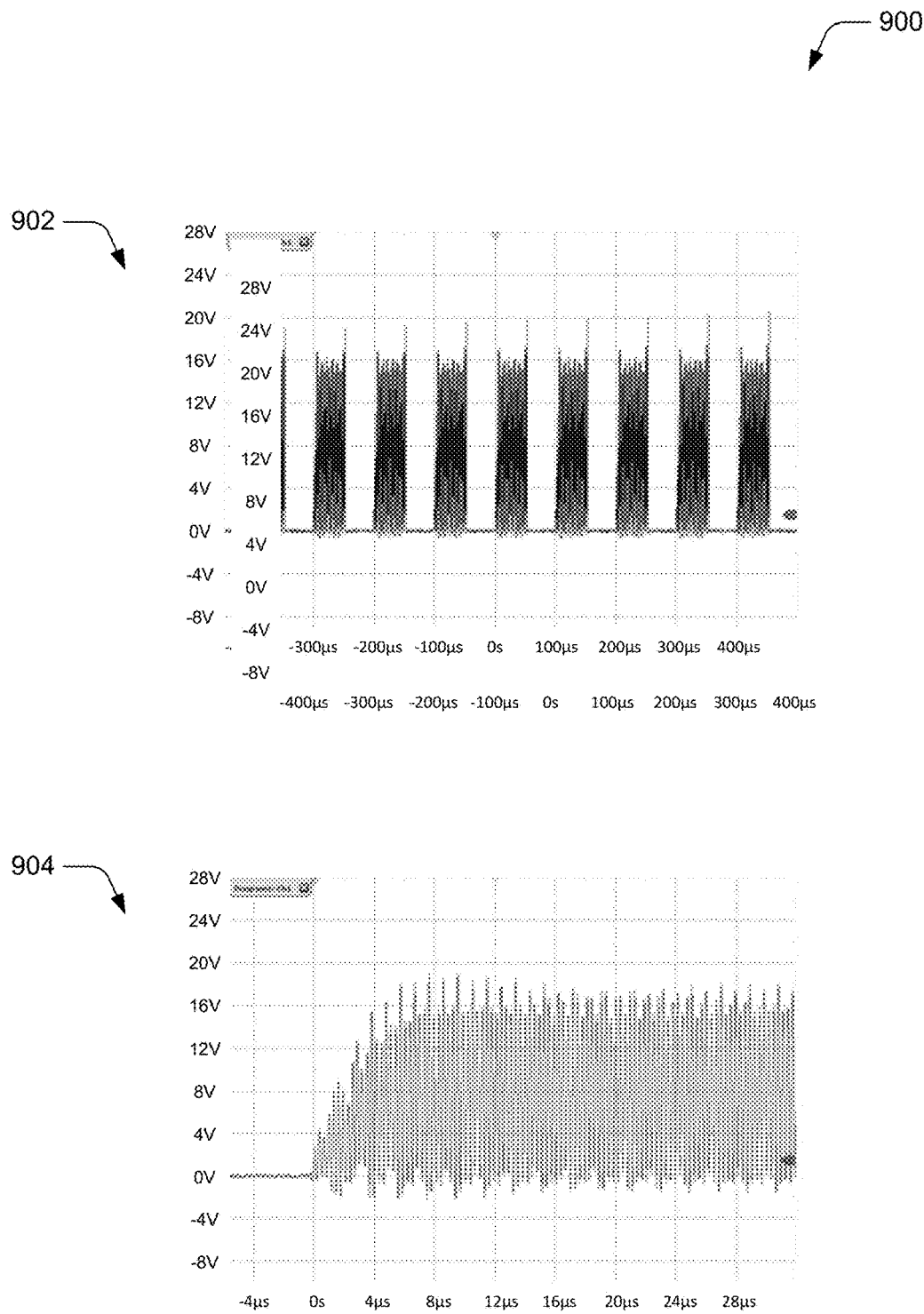
FIG. 9 illustrates an example beacon operation measured at transistor drain with external stimulus to simulate a foreign object detection sense signal.

FIG. 9 illustrates an example 900 beacon operation measured at transistor drain with external stimulus to simulate FOD sense signal. Waveform 902 was measured with an external stimulus present to inductively inject a 3 MHz signal. This simulates what happens when the beacon loop AFE is placed above the base power-transfer system 110 with an FOD system running. Zoomed in on the time axis, waveform 904 shows beacon turn-on. The signal envelope is shaped by the Q-factor of the loop. With a Q-factor of 20, about 20 oscillations (equals to about 6.6 μs) are needed to reach steady state. This results in an effective reduction of the 10 kHz duty cycle. In an example, the original 50% duty cycle is reduced to about 48%. Stability of the duty cycle of the 10 kHz beacon signal allows for successful suppression of the beacon signal in the FOD data stream (beacon cancellation).

Figure 10:
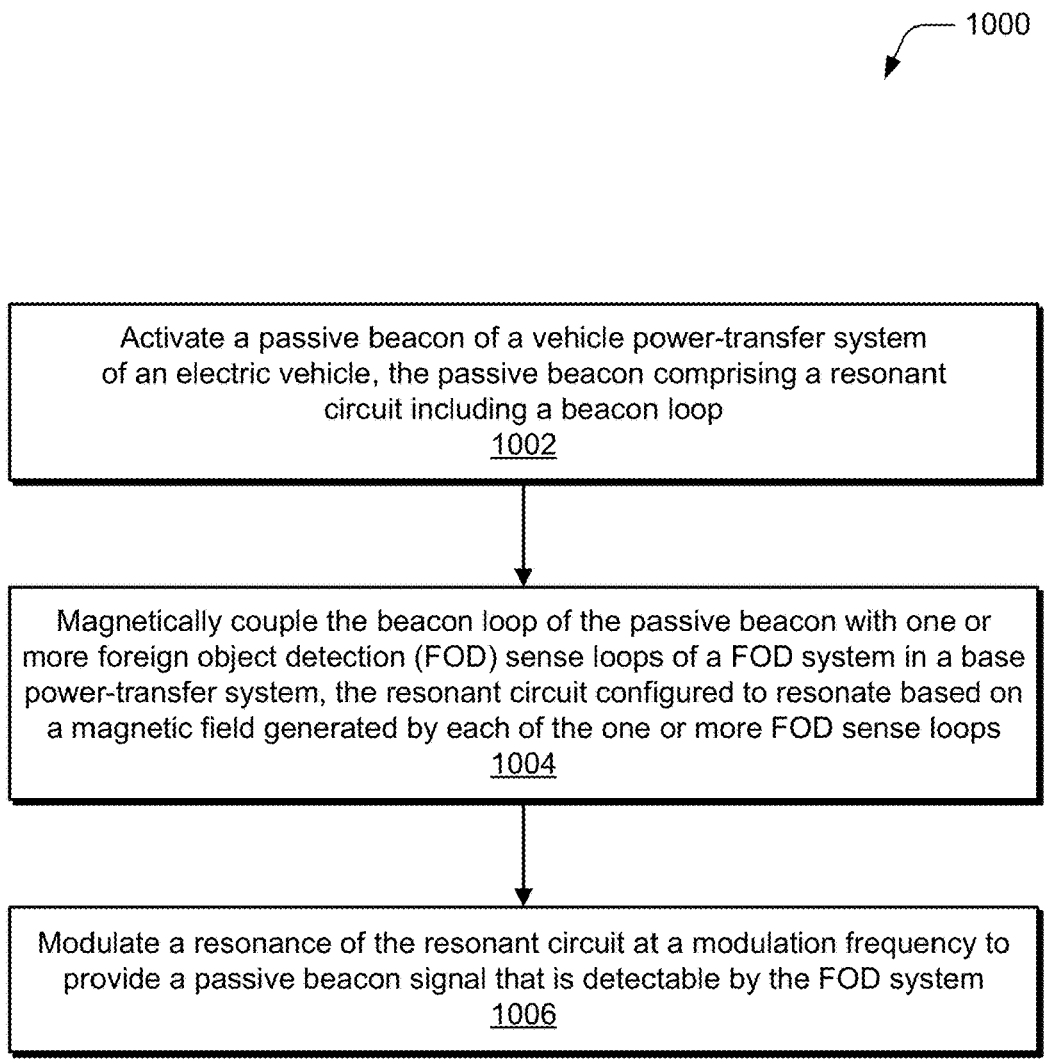
FIG. 10 is a flow diagram illustrating an example process for providing positioning signaling using a hybrid foreign-object detection and positioning system.

FIG. 10 is a flow diagram illustrating an example process 1000 for providing positioning signaling using a hybrid foreign-object detection and positioning system. The process 1000 is described in the form of a set of blocks 1002-1006 that specify operations that can be performed. However, operations are not necessarily limited to the order shown in FIG. 10 or described herein, for the operations may be implemented in alternative orders or in fully or partially overlapping manners.

At block 1002, a passive beacon of a vehicle power-transfer system of an electric vehicle is activated. In aspects, the passive beacon comprises a resonant circuit including a beacon loop. In an example, the passive beacon is activated based on activation of a signal generator that drives the passive beacon and causes the beacon loop to modulate its resonance. In an example, a passive beacon circuit includes a beacon loop electrically connected in series to a capacitor to form a resonant circuit that is electrically connected to a transistor, which is configured to modulate an impedance state of the passive beacon circuit in response to a modulation control signal in a manner to cause a predetermined response at a FOD system that is characteristic of the passive beacon circuit. In at least one implementation, the impedance state can be modulated between a resonant state and a non-resonant state.

At block 1004, the beacon loop of the passive beacon is magnetically coupled with one or more FOD sense loops of a FOD system in a base power-transfer system. In aspects, the resonant circuit is configured to resonate based on a magnetic field generated by each of the one or more FOD sense loops. For example, as a vehicle moves over the base power-transfer system, high-frequency magnetic fields generated by the sense loops in the FOD system at the base power-transfer system interact with the beacon loop. Based on the high-frequency magnetic fields generated by the sense loops, the beacon loop AFE resonates.

At block 1006, a resonance of the resonant circuit is modulated at a modulation frequency to provide a passive beacon signal that is detectable by the FOD system. In at least some aspects, the resonance of the beacon loop AFE is toggled on and off at a predefined modulation frequency to create a modulation. This toggling may be performed by a passive modulation switch. As described in further detail below, this toggling enables the beacon loop AFE to be modulated at a modulation frequency that does not interfere with the FOD system.

In at least some aspects, the modulation of the beacon loop AFE may induce an impedance change in the one or more sense loops of the foreign object detection system to enable detection of the beacon loop AFE as a metal object with distinctive properties. For example, based on the passive beacon signal, the beacon loop AFE can be detected by the FOD system as a special object rather than a typical unwanted foreign object. The modulation is a response that differs from a more static impedance change detected by typical foreign metal objects. In this way, a position of the beacon loop AFE relative to the sense loops in the FOD system at the base power-transfer system can be detected for positioning and guidance of the vehicle for alignment with the base power-transfer system. For instance, the position of the beacon loop AFE can be determined based on which sense loops in an array of sense loops in the FOD system detect a modulating impedance change caused by the beacon loop AFE. Because physical proximity of the beacon loop AFE creates a stronger FOD response in a sense loop, the position of the beacon loop AFE can be determined based on which sense loops detect the strongest impedance change.

Beacon Activation

To enhance the user experience and enable parking maneuvers, the beacon subsystem is fully integrated into the overall wireless electric vehicle charging (WEVC) system. Due to the spatial resolution capabilities of the sensor array structure, the FOD system can estimate the position of the passive beacon as soon as the beacon reaches the coverage area of the FOD system. Additionally, FOD can distinguish between the passive beacon signal and a foreign object that would trigger an FOD alarm.

Figure 11:
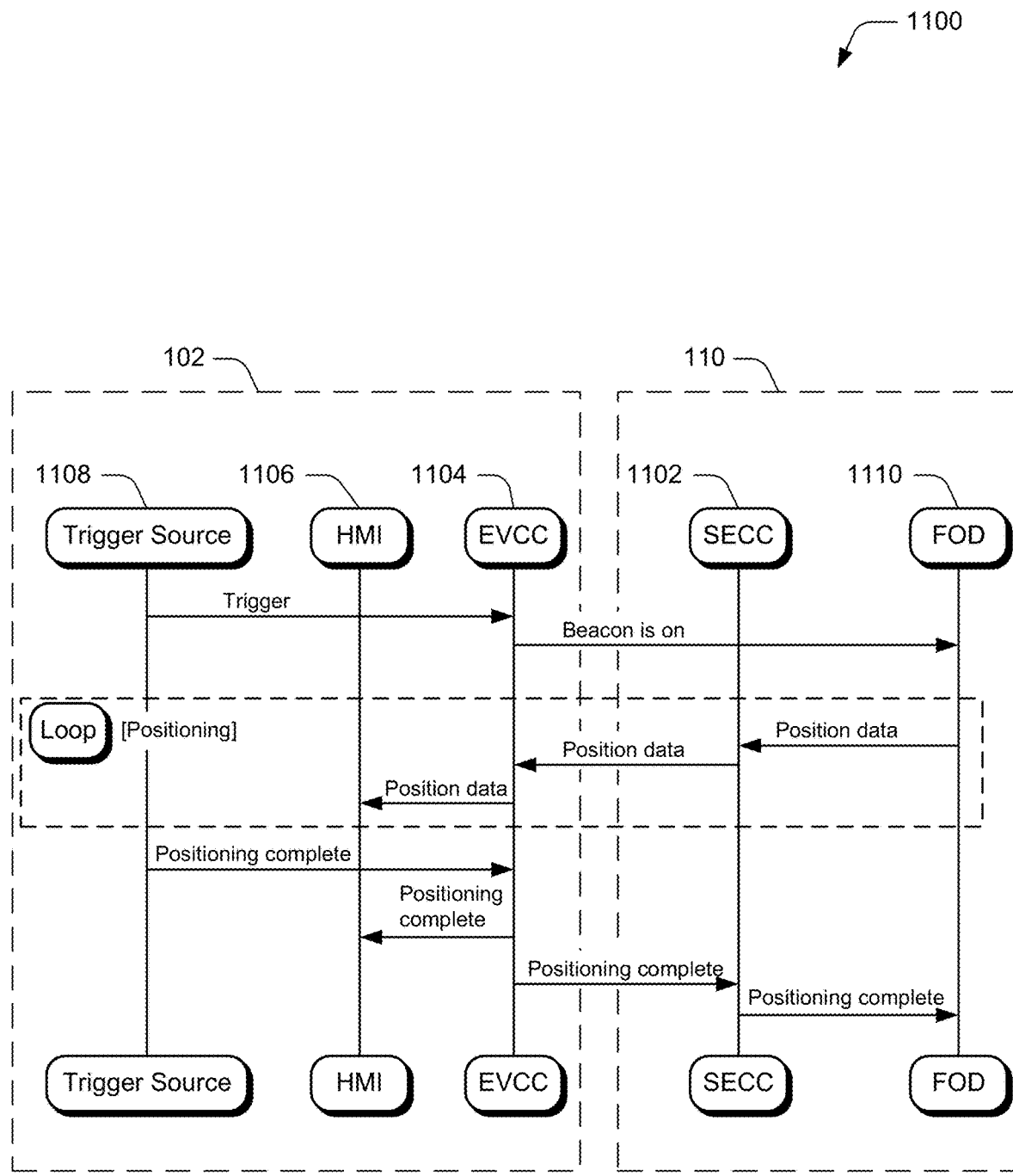
FIG. 11 illustrates an example communication flow of a hybrid foreign-object detection and positioning system.

FIG. 11 illustrates an example 1100 communication flow of a hybrid foreign-object detection and positioning system. In aspects, the passive beacon can be activated during a parking maneuver of the vehicle to maximize FOD sensitivity, minimize overall WEVC power consumption, and avoid unnecessary traffic on a communication link between the base power-transfer system and the vehicle power-transfer system. In at least one aspect, the communication link may be a link between a supply equipment communication controller (SECC) 1102 of the base power-transfer system 110 and an electric vehicle communication controller (EVCC) 1104 of the vehicle power-transfer system 114 of the electric vehicle 102.

The beacon can be activated via a human-machine-interface (HMI) 1106 in the vehicle 102 or by an external trigger source 1108. The HMI 1106 can include any of a variety of different interfaces via which the system can interact with a user visually or audibly. The HMI 1106 may include a graphical user interface presented via a display screen, one or more lights providing visual feedback, audible signals that are output via one or more speakers, and so on. Depending on the situation, the external trigger can be detected from the communication link as soon as the communication link is established, or the trigger can originate from geofence information obtained from a global positioning system (GPS), for example. In another example, the vehicle ignition can be used as the trigger source 1108, causing the passive beacon to be activated when the vehicle 102 is running. This is allowable due to the passive beacon consuming a minimal amount of power and generating no emissions.

If the system indicates that the passive beacon needs to be activated, the EVCC 1104 can activate the signal generator that drives the passive beacon. Once the passive beacon is turned on and is overlapping the sensor array of a FOD system 1110, the FOD system 1110 can detect the signal from the passive beacon. Using the beacon's signal, the FOD system 1110 can compute the position of the vehicle power-transfer system and send position data to the SECC 1102 of the base power-transfer system 110. The SECC 1102 sends the position data to the EVCC 1104 in the vehicle 102, and the EVCC 1104 forwards the position data to the HMI 1106 to notify the user of the vehicle 102 of the position of the vehicle-power transfer system relative to the base power-transfer system 110.

Once positioning of the vehicle 102 is complete, such that the position data indicates that the vehicle power-transfer system is aligned with the base power-transfer system 110, an indication of completion of the positioning can be generated. The indication can be generated by a trigger source, such as the trigger source 1108. Alternatively, a user input can be received via the HMI 1106 indicating that the vehicle is positioned in accordance with the user's desires. The indication of completion is transmitted to the EVCC 1104, which then sends a positioning complete signal to the HMI 1106 to indicate to the user that the vehicle is aligned with the base power-transfer system. In addition, the EVCC 1104 sends the positioning complete signal to the SECC 1102 of the base power-transfer system 110, which forwards the positioning complete signal to the FOD system 1110. Upon receipt of the positioning complete signal, the FOD system 1110 can terminate positioning computations of the vehicle 102 to conserve power. In aspects, the beacon can be deactivated by the EVCC 1104 based on the indication of completion of positioning of the vehicle 102. Alternatively, the beacon can continue to be activated subsequent to completion of the positioning of the vehicle 102 and during charging of the vehicle 102.

FOD Setup

As described above, the FOD system uses an array of sensors, such as the FOD loop array 606 from FIG. 6. An example FOD loop array 606 includes a number of array elements, such as 64 sense coils, on the surface of the base power-transfer system 110 to detect foreign objects that could heat up in the presence of the alternating magnetic field. The complex impedance of each array element is constantly measured and monitored, and any changes caused by the introduction of a foreign object are tracked. By implementing an array, the resulting response possesses positioning information with a certain spatial resolution. In the hybrid foreign-object detection and positioning system, this spatial resolution is used to build a positioning system that delivers centimeter-range accurate information. The sense coil array can be operated by several parallel analog- and processing-channels to allow parallel measurements. This helps to speed up the overall array scanning process.

The passive beacon on a primary side (e.g., the vehicle side) generates a FOD response at a secondary side (e.g., the base side) that is evaluated and used to calculate the positioning information. The FOD system may be an impedance measurement system, enabling the beacon to be implemented at the vehicle side either as a passive beacon or as an active beacon. A passive beacon on the vehicle side can be implemented with minimal hardware components and minimal impact on the design of the vehicle power-transfer system, resulting in minimal cost and complexity. In addition, the FOD system's response to a passive beacon may have increased accuracy.

One difference between an active beacon and a passive beacon is the FOD system's response defined by a coupling factor k. For instance, the passive beacon relies on a squared coupling factor $k^2$ while the active beacon may rely on a linear coupling factor k. The squared coupling factor $k^2$ for the passive beacon provides a sharper and more localized FOD response, as shown in Equation 1 below.

Figure 12:
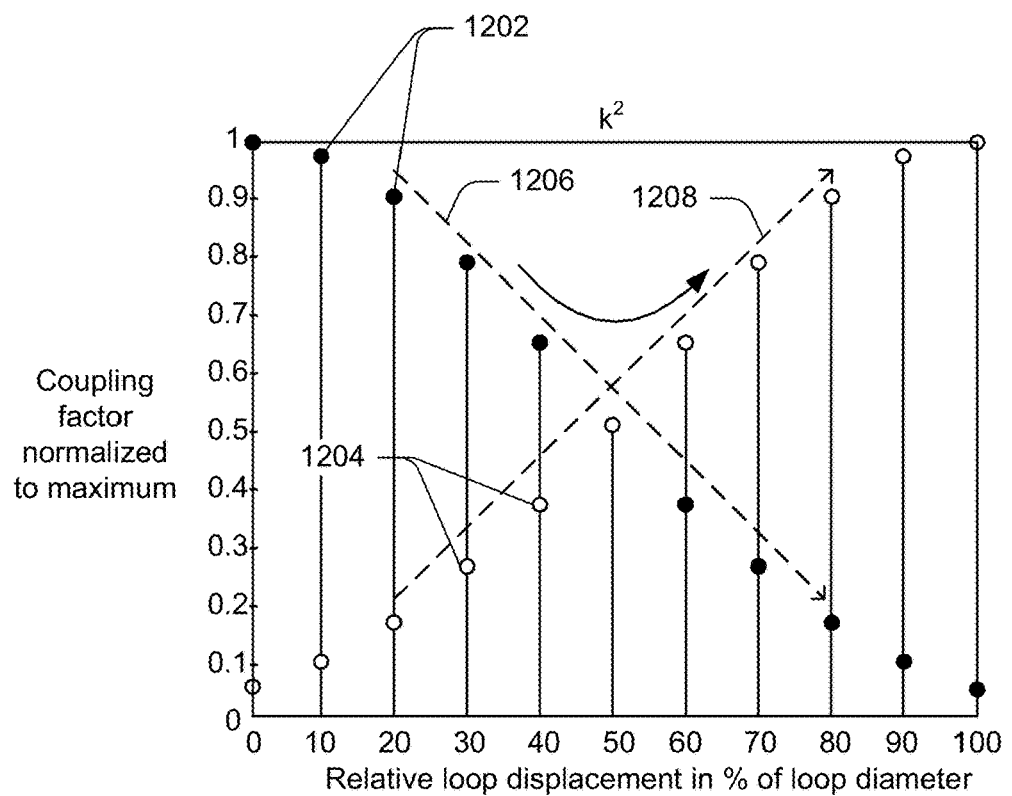
FIG. 12 illustrates an example of a passive beacon transitioning between two foreign object detection sense loops.

FIG. 12 illustrates an example 1200 of a passive beacon transitioning between two FOD sense loops. As the passive beacon transitions from a first FOD sense loop to a second FOD sense loop that is adjacent to the first FOD sense loop, a resulting coupling factor ripple is generated. This coupling factor ripple is illustrated in FIG. 12. For example, the coupling factor of the first sense loop diminishes, as illustrated by solid circles 1202, as the passive beacon moves away from the first sense loop. At the same time, the coupling factor of the next sense loop increases, as illustrated by open circles 1204. The resulting ripple in this example is about 50%.

The coupling factor curve can be approximated by a linear function (shown as dashed lines 1206, 1208) in the range between 20%-80% relative displacement, leading to high position sensitivity if the passive beacon loop is placed somewhere between two FOD sense loops. This is advantageous for the used position algorithm, which determines the center of gravity (CG) of the overall FOD system response.

The response of the FOD system to the passive beacon loop can be characterized by Equation 1:

$$\frac{\Delta Z_S}{R_S} \cong \frac{k^2 \cdot Q_S \cdot Q_B}{1 - j \cdot 2 \cdot Q_B \cdot \frac{\omega_B - \omega_0}{\omega_0}} \quad \text{Equation 1}$$

Here, the term $\Delta Z_S$ refers to an impedance change of a FOD sense loop, the term $R_s$ refers to a nominal series resistance of the FOD sense loop RE $\{Z_{S0}\}$, and the term k is the coupling factor between the FOD sense loop and the beacon loop [0 . . . 1]. In addition, the term $Q_s$ refers to a quality factor of the FOD sense loop, and the term $Q_B$ refers to the quality factor of the beacon loop.

In Equation 1, it is assumed that the FOD sense loop is operated at its resonance frequency ($\omega_S = \omega_0$). This is a reasonable assumption for an FOD system. Given this assumption, the FOD system's response can be normalized with the nominally measured series resistance $R_S$, resulting in the response $\Delta Z_S/R_S$. In aspects, the FOD system's response may depend on the Q-factors of both loops involved. The passive beacon loop tuning is also considered. For instance, the term $(\omega_B - \omega_0)/\omega_0$ in the denominator of Equation 1 can be defined as $\Delta\Omega_B$, which is the fractional angular frequency offset or passive beacon resonance detuning and is further described below with respect to FIG. 13.

Figure 13:
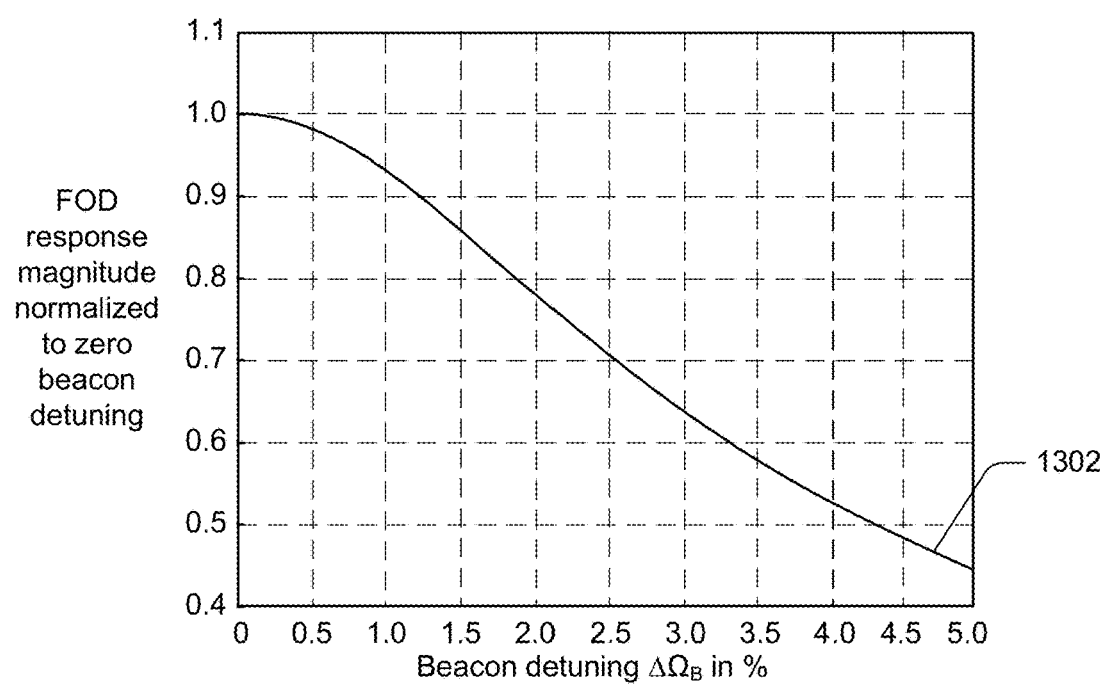
FIG. 13 illustrates an example, which shows an evaluation of a magnitude of the response to the foreign object detection system to the passive beacon loop.

FIG. 13 illustrates an example 1300, which shows an evaluation of a magnitude of the response to the FOD system to the passive beacon loop. In the example 1300, a magnitude 1302 of the function from Equation 1 is evaluated and normalized to a maximum FOD system's response occurring at zero passive beacon resonance detuning. At 1% passive beacon detuning (e.g., the passive beacon is resonant at 3.03 MHz but the FOD loop is operated at 3.00 MHz), the FOD system's response is already reduced by about 7%. At a detuning of 4.3%, FOD response is lowered by about 3 dB.

In the example 1300 of the FOD system, the frequencies used are spread out over approximately 150 kHz around the 3 MHz center frequency. When tuning the passive beacon loop to the center of this band, the maximum detuning that can occur is approximately 2.5%, leading to an acceptable loss of FOD system response of about 30%. When the beacon loop is tuned to the upper or lower end of the FOD band, the maximum detuning doubles and becomes significant, leading to an unacceptable loss of FOD response up to 60%.

Accordingly, the passive beacon can be tuned to the center of the FOD system's frequency band (e.g., the resonant frequency of the resonant circuit of the passive beacon is tuned to be near or at the center of the band of the signal used to drive the FOD sense loops). This helps to optimize for the best possible FOD response (with given Q-factors) and the most margin for possible long-term drifts due to ageing and temperature effects.

Passive Beacon Detection

Figure 14:
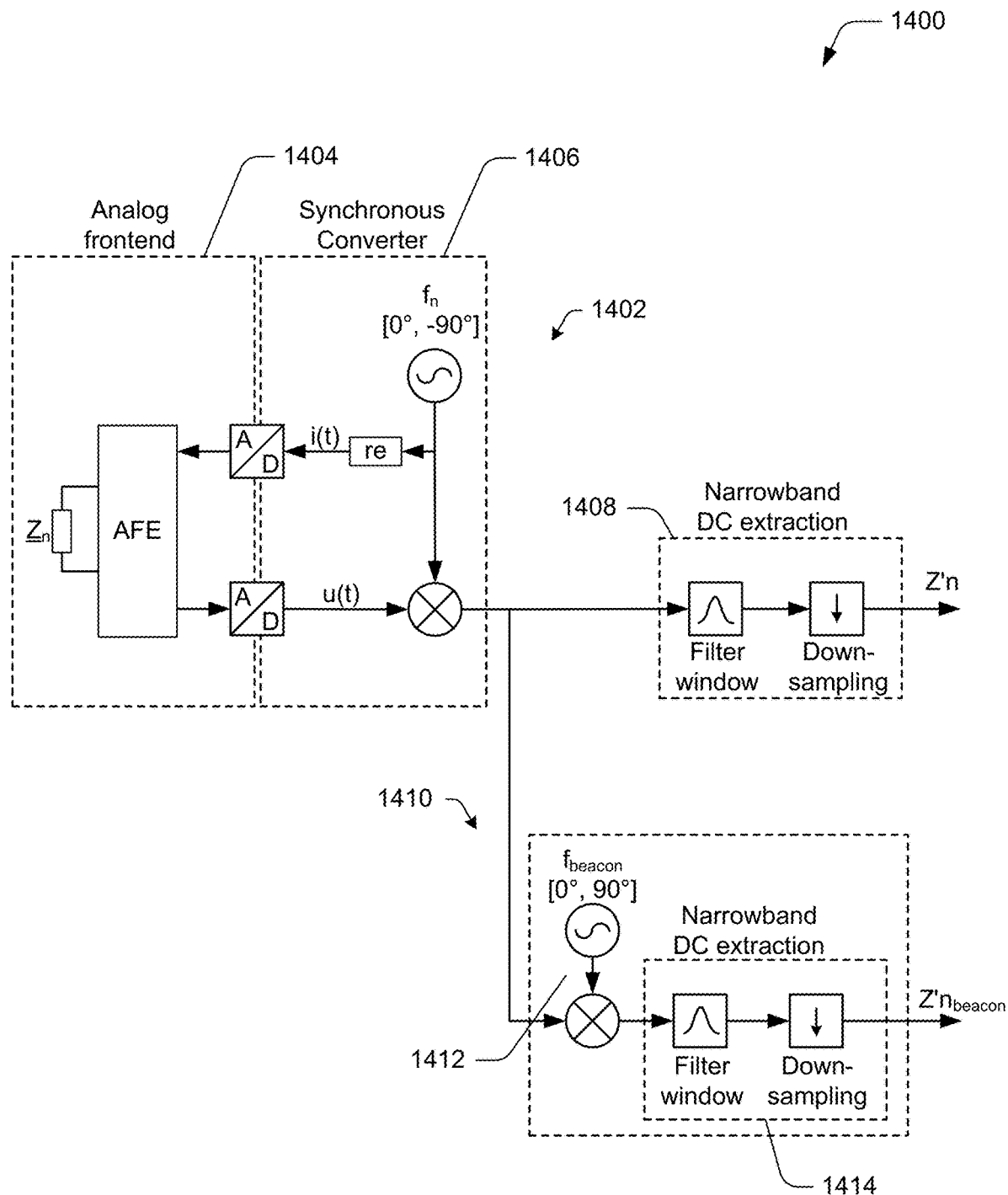
FIG. 14 illustrates an example signal processing schematic for passive beacon detection.

FIG. 14 illustrates an example signal processing schematic 1400 for passive beacon detection. The passive beacon 118 (FIG. 1) can be switched ON when the positioning service is required. The modulation of the passive beacon 118 installed in the vehicle power-transfer system 114 manifests itself as an amplitude modulation on the injected sense signal of each FOD sense loop. The passive beacon 118 can be switched ON by powering up the modulation control signal generator 202 from FIG. 2, or, when already powered, by releasing its disable pin. The main software and control effort is performed by the FOD system, such as the FOD system 1110 of FIG. 11. Existing signal processing is extended by an additional parallel signal processing path to allow passive beacon detection.

For example, FOD signal processing path 1402 is illustrated as including an analog frontend 1404, a synchronous detector 1406, and a narrowband direct current (DC) extraction filter 1408. Here, the FOD signal processing path 1402 is extended by a parallel signal processing chain 1410, which includes a complex digital downconverter 1412 operated at the passive beacon frequency, followed by another narrowband DC extraction filter 1414. Instead of extracting the static (DC) component of the FOD response, the beacon modulation control signal is extracted by mixing it down to DC as well. Use of a sequential synchronous detector and a digital downconverter (e.g., synchronous detector 1406, downconverter 1412) has the advantage that the local oscillator for the passive beacon frequency $f_{beacon}$ can generate a constant frequency that can be reused in all FOD hardware channels (e.g., four). In contrast, the local oscillators required to generate the sense signals for different FOD loops $f_n$ change their frequency during the scanning process and therefore cannot be reused on all hardware channels. If the passive beacon frequency is changed, however, only the parameter $f_{beacon}$ needs to be adapted in the FOD signal processing.

Having different passive beacon frequencies available can support the WEVC system pairing process in a multi-vehicle/multi-parking scenario. This is similar to using different passive beacon channels to distinguish different approaching vehicles. Also, different frequencies can be used to install a second passive beacon on a vehicle (e.g., in the front bumper) to increase the operating range of the positioning system.

The applied filtering in the parallel signal processing chain 1410 for the passive beacon detection signal processing is substantially equivalent to the filtering used in the FOD signal processing path 1402. This ensures that passive beacon cancellation can be applied, which is described further below. Differing filters in the two signal processing chains could lead to a much more complex correction factor, which might be dependent on the position and therefore difficult to approximate.

Although the FOD system's response to the passive beacon is filtered in a separate, dedicated signal processing branch, such as the parallel signal processing chain 1410, the beacon also influences the measured raw signal for the ordinary FOD processing, such as the FOD signal processing path 1402. The influence of the beacon's response can potentially trigger an FOD false alarm. However, this effect can be compensated to allow normal FOD system operation (with similar sensitivity) during beacon operation.

In at least one implementation, the FOD system raw data can be offset by an average value of the beacon modulation signal. A Fourier transformation can be performed on a pulse train signal (e.g., 10 kHz) applied to the beacon loop for passive modulation, resulting in a series of Fourier coefficients including $c_0$, also known as the signal's DC component. The actual beacon's response, measured in the FOD signal processing path 1402, measures the fundamental signal only, as the applied filtering is narrowband. The fundamental signal's magnitude corresponds to the Fourier coefficient $c_1$. Since the two signal processing chains use the same filtering and down sampling, the signal ratio is directly $c_0/c_1$. By knowing this ratio, the beacon response can be subtracted from the FOD raw data.

In aspects, the ratio $c_0/c_1$ can be determined based on the following:

$$\frac{c_0}{c_1} = \frac{1}{sinc(d)} \quad \text{Equation 2}$$

where the term d refers to a duty cycle of the pulse train signal, and the ratio $c_0/c_1$ becomes a correction factor. Therefore, to cancel out the influence of the beacon from the FOD raw data magnitude, the beacon's measured signal can be multiplied by the correction factor $c_0/c_1$ and the result can be subtracted from the FOD raw data magnitude. Variations in duty cycle d can lead to variations of the correction factor $c_0/c_1$. Therefore, the duty cycle should be stable and known to the system.

Some analog hardware may not be entirely free from intermodulation between the measurement frequencies. Intermodulation products may be produced by non-linearities in any part of the system. The beacon modulation signal frequency $f_{beacon}$ can be selected such that interference with the FOD system is reduced or minimized. Various interference mechanisms can be avoided by carefully selecting the modulation frequency. For example, an upper side band beacon frequency of FOD loop x overlapping with FOD measurement frequencies of FOD loop y can be avoided based on an appropriately selected modulation frequency and FOD measurement frequencies. Additionally, a particular selected modulation frequency can result in avoidance of intermodulation products of a variety of combinations of FOD measurement frequencies, falling onto the upper side band beacon frequency of FOD loop x. These example interference frequencies can be avoided upfront based on the selected beacon modulation signal frequency $f_{beacon}$.

Figure 15:
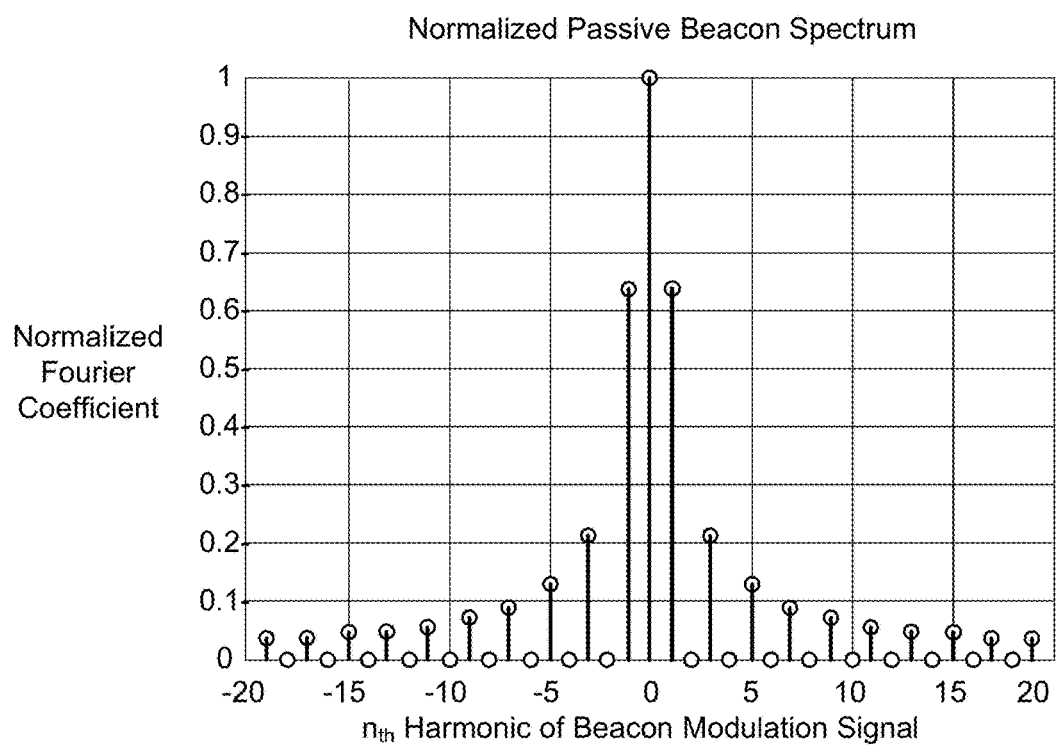
FIG. 15 illustrates an example implementation of a passive beacon modulation spectrum.

FIG. 15 illustrates an example implementation 1500 of a passive beacon modulation spectrum. In the example implementation 1500, Fourier coefficients of a rectangular modulation signal with a 50% duty cycle are shown. The central frequency at n=0 corresponds to the DC component $c_0$ after a synchronous detector, and n=1 corresponds to $c_1$, which is the upper side band beacon frequency of FOD loop x.

Strong odd-order harmonics can be shifted in between the FOD measurement frequency raster. Due to high suppression of the applied narrowband filter, interference between the FOD measurement frequencies and the odd-order harmonics of the passive beacon can be avoided. Hence the passive beacon modulation frequency can be defined as:

$$f_{beacon} = df \cdot (N + 0.5) \quad \text{Equation 3}$$

In Equation 3, the term df refers to a FOD measurement frequency spacing given by a numerically controlled oscillator step size. In addition, the term N refers to an integer number of spacings in the FOD measurement frequency raster to offset the passive beacon frequency.

Even-order intermodulation products can be neglected because they fall outside the FOD measurement band. Some odd-order intermodulation products, however, may fall onto the FOD measurement frequency raster, which is the same raster on which some even-order harmonics of the passive beacon fall on. Interferences between the even-order intermodulation products and the odd-order harmonics, from which the passive beacon magnitude is extracted, should be avoided. Ideally, remaining even-order harmonic magnitudes would be zero, as illustrated in FIG. 15. However, in practice, the remaining even-order harmonic magnitudes are not zero, but are a few percent of $c_0$, due to inaccuracies of the duty cycle.

Figure 16:
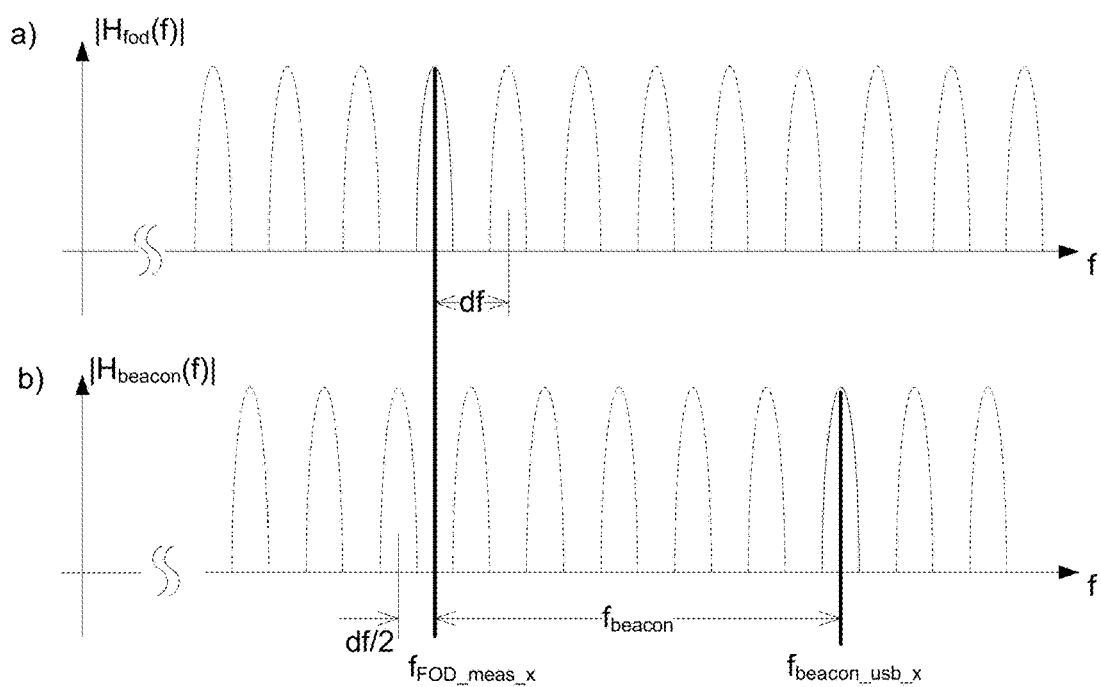
FIG. 16 depicts an example implementation of a filter frequency response raster compared with an FOD measurement raster.

FIG. 16 depicts an example implementation 1600 of a filter frequency response raster compared with an FOD measurement raster. To reduce interference, the filter frequency response of FOD can be shifted by df/2 relative to the filter frequency response of the passive beacon extraction filter. Alternatively, the passive beacon extraction filter can be shifted by df/2 relative to the FOD filter response. In FIG. 16, raster a) shows the filter frequency response of FOD and raster b) shows the passive beacon extraction filter. As illustrated, the passive beacon extraction filter is shifted by df/2 relative to the FOD filter response. These two frequency rasters are considered orthogonal due to high filter suppression.

As a restriction to the selection of FOD measurement frequencies, collisions between a FOD measurement frequency and (two-sided) even-order harmonics of the beacon frequency should be avoided. Meeting this restriction results in interference-free operation of the positioning and FOD systems. To reduce the number of frequencies to be avoided, a higher beacon frequency may be used, which may lower a count of passive beacon harmonics in the FOD measurement band. However, a beacon frequency that is too high may have negative effects on the duty cycle accuracy. Also, an accurate duty cycle allows for the passive beacon in the FOD data to be properly canceled out. In at least one example, a passive beacon modulation frequency in the range from 5 kHz to 10 kHz may be used without major drawbacks.

The position of the beacon loop on the vehicle can be determined by computing the center of gravity of the overall FOD system response. The center of gravity (CG) can be computed in both the X- and Y-directions (e.g., $X_{CG}$ and $Y_{CG}$, respectively) from the magnitude of the passive beacon data provided by the array of FOD sense loops. For example, the following example equations can be used to determine each of the X- and Y-positions of the center of gravity of the overall FOD response:

$$X_{CG} = \frac{\sum_{i=0}^{N-1} |\Delta Z_{S_i}| \cdot x_i}{\sum_{i=0}^{N-1} |\Delta Z_{S_i}|} \quad \text{Equation 4}$$

$$Y_{CG} = \frac{\sum_{i=0}^{N-1} |\Delta Z_{S_i}| \cdot y_i}{\sum_{i=0}^{N-1} |\Delta Z_{S_i}|} \quad \text{Equation 5}$$

where the term N refers to the number of FOD sense loops in the array. Any suitable datum can be used to define $x_i$ and $y_i$. In at least one example, matrix row- and column-indices can be used. Given the coupling factor ripple described above, the center of gravity acts as a spatial filter for when the passive beacon loop is positioned in-between the FOD sense loops. In contrast, merely searching for the peak point of the FOD system response and using that as the beacon loop location may fail when the passive beacon loop is positioned somewhere between the FOD sense loops.

An additional factor to consider when determining the position of the beacon loop relative to the base power-transfer system 110 is distortion caused by noise affecting one or more of the FOD sense loops. For example, consider a first loop measuring a large passive beacon magnitude, which corresponds to a true beacon position, and a second loop at a distance d measuring a small magnitude, e.g., caused by noise. The small magnitude may distort the determination of the true beacon position, resulting in position error. The larger the distance d, the larger the position error caused by this unwanted response, e.g., caused by noise. If just a few of the FOD sense loops in the loop array have a large magnitude and the rest of the loops each contribute only a small weight to the center of gravity due to noise, the computed position accuracy may suffer and jitter may be increased. As a countermeasure, not all the FOD sense loops in the loop array are considered for position calculation, but only a few loops with the strongest passive beacon magnitude.

To mask the loops with the small magnitudes, a dynamic threshold may be used based on a noise estimation. The dynamic threshold calculation is based on several steps. For instance, the magnitudes of all the FOD sense loops in the array are sorted, such as in ascending order. Subsequently, a magnitude is selected at a position corresponding to a percentile parameter, which may be predefined. The selected magnitude may then be multiplied by a threshold multiplication factor parameter. Finally, based on a comparison between the calculated threshold and the minimum threshold parameter, the greater of the two thresholds is selected.

After the dynamic threshold calculation, the passive beacon may be validated. This can avoid processing position calculations based on weak signals with a significantly low signal to noise ratio resulting in unstable data. The position is calculated as the center of gravity of a subset of the FOD sense loops in the loop array, such as by using one or more passive beacon magnitudes of the FOD sense loops that exceed the dynamic threshold. For instance, each FOD sense loop with a passive beacon magnitude higher than the threshold contributes one data sample to the center of gravity calculation. If only one data sample for the center of gravity calculation is available, the center of gravity would result in an x,y location of that data sample. Using a minimum of two data samples allows fine interpolation along the edge of the loop array if the passive beacon is still outside the loop array area. If the passive beacon is located over the loop array area, then the minimum required number of data samples may be increased.

The array of sorted magnitudes from the threshold calculation can be iterated, such as by starting from the highest magnitude until a magnitude that falls below the threshold is found. This iteration may be performed using modified versions of Equations 4 and 5 above as follows:

$$X_{CG} = \frac{\sum_{i=63}^{i_{stop}+1} |\Delta Z_{S_i}| \cdot x_i}{\sum_{i=63}^{i_{stop}+1} |\Delta Z_{S_i}|} \qquad \text{Equation 6}$$

$$Y_{CG} = \frac{\sum_{i=63}^{i_{stop}+1} |\Delta Z_{S_i}| \cdot y_i}{\sum_{i=63}^{i_{spot}+1} |\Delta Z_{S_i}|} \qquad \text{Equation 7}$$

The first array index with a magnitude below the threshold is denoted as $i_{stop}$.

It should be appreciated that in any of the implementations described herein the admittance Y may be used in place of the impedance Z. For example, depending on the analog hardware used in the FOD system, the passive beacon modulation signal may be measurable as admittance $\Delta Y_{S_i}$. More generally, the admittance Y of the FOD loop may be measured rather than the impedance Z in certain implementations. The impedance Z may therefore be substituted in any of the equations or other calculations or determinations described herein (e.g., this substitution may apply at least to Equations 6, 7, 10, 11, 12, 13, 14, 16 as well as applied with reference to FIGS. 17, 18, 20).

The center of gravity computation accuracy may be limited when the passive beacon is proximate to, but outside of, the boundary of the loop array area. This is because the center of gravity cannot be outside a center-of-gravity area defined by the center of each FOD loop located at the edge of the loop array. Thus, an algorithm may be applied to correct boundary effects that cause inaccuracies in the position detection of the passive beacon when the beacon is outside of the center-of-gravity region. Any suitable algorithm may be used.

One example algorithm includes applying a linear function with a single parameter, such as an edge stretch factor $F_{XS}$ and $F_{YS}$, when the calculated center of gravity is in an area between a center of an edge FOD loop and an inner border of the edge FOD loop. The edge stretch factor refers to a rectangular shape of FOD loops on the edge of the array of FOD sense loops, the $F_{XS}$ factor for an x-direction and the $F_{YS}$ factor for a y-direction. The following equations may be implemented:

$$X \cong \begin{cases} X_{ESZ} + F_{XS} \cdot (X_{CG} - X_{ESZ}), & X_{CG} > X_{ESZ} \\ -X_{ESZ} + F_{XS} \cdot (X_{CG} + X_{ESZ}), & X_{CG} < -X_{ESZ} \end{cases} \qquad \text{Equation 8}$$

$$Y \cong \begin{cases} Y_{ESZ} + F_{YS} \cdot (Y_{CG} - Y_{ESZ}), & Y_{CG} > Y_{ESZ} \\ -Y_{ESZ} + F_{YS} \cdot (Y_{CG} + Y_{ESZ}), & Y_{CG} < -Y_{ESZ} \end{cases} \qquad \text{Equation 9}$$

The stretch factor $F_{XS}$ is used to stretch the position out up to the border of the base power-transfer system (e.g., a coil) in the x-direction. The stretch factor $F_{YS}$ is used to stretch the position out up to the border of the base power-transfer system in the y-direction. The terms $X_{CG}$ and $Y_{CG}$ refer to center of gravity positions calculated in the x- and y-directions, respectively. The terms $X_{ESZ}$ and $Y_{ESZ}$ are used to define a location of an inner border of the edge stretch zone, which corresponds to an inner edge of the edge loops.

A more sophisticated correction function may be used to more accurately approximate the passive beacon response shape. However, high position accuracy is only needed in the center of the base power-transfer system, and high position accuracy on the edges of the base power-transfer system is not critical. Thus, the algorithm above provides an example of a simple solution to correct boundary effects that cause inaccuracies or unfavorable system behavior in the position detection of the passive beacon when the beacon is outside of the center-of-gravity region.

Passive Beacon Cancellation

As mentioned above, the $c_0/c_1$ ratio of the Fourier series is used to cancel out the influence of the passive beacon from the FOD raw data magnitude, where the term $c_0$ refers to the DC component (e.g., the change seen in the FOD data used for foreign object detection) and the term $c_1$ refers to the fundamental magnitude of the passive beacon modulation pulse train signal. This allows the FOD detection algorithm to run in parallel with the position detection algorithm without interference. In aspects, the ratio $c_0/c_1$ is a constant value, given by the passive beacon hardware, and derivable based on a fixed duty cycle.

Figure 17:
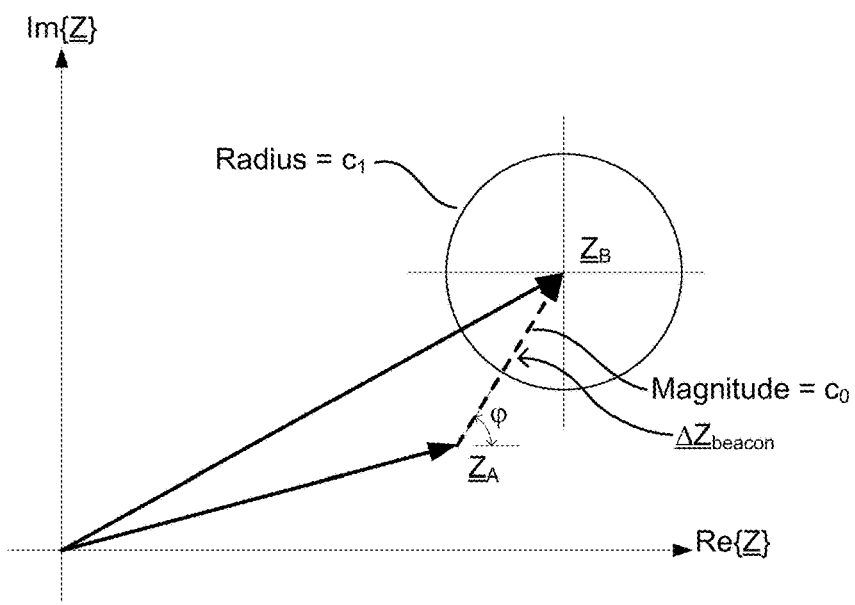
FIG. 17 illustrates an example implementation of a passive beacon response in a complex impedance plane when the passive beacon is activated.

FIG. 17 illustrates an example implementation 1700 of a passive beacon response in a complex impedance plane when the passive beacon is activated. In FIG. 17, a delta (change) in the impedance plane caused by the passive beacon $\Delta Z_{beacon}$ is shown in polar form with magnitude $c_0$ and angle $\varphi$. The passive beacon fundamental Fourier coefficient $c_1$ can represent a rotating phasor, hence an angle at any point in time depends on the frequency offset between a passive beacon transmitter and the numerically controlled oscillator generating the modulation frequency $f_{beacon}$. Therefore, $c_1$ is represented as a circle in FIGS. 17 and 18. A radius of the circle representing $c_1$ can be scaled with the proper $c_0/c_1$ factor to achieve full cancellation of $\Delta Z_{beacon}$. When fully canceled, a measured loop impedance with the passive beacon switched ON ($\underline{Z}_B$) is converted to the loop impedance with the passive beacon switched OFF ($\underline{Z}_A$), using the following equation:

$$\underline{Z}_B = \underline{Z}_A + \Delta \underline{Z}_{beacon} = \underline{Z}_A + c_0 * e^{j\varphi} \qquad \text{Equation 10}$$

Since the passive beacon loop is tuned to resonance at the center of the FOD measurement frequency band, the angle $\varphi$ has a high sensitivity to the measurement frequency. Hence, the angle $\varphi$ of impedance delta caused by the passive beacon can be considered as unknown in an absolute sense. In a time-differential sense, the angle $\varphi$ can be determined if both $\underline{Z}_A$ (the loop impedance with the passive beacon switched OFF) and $\underline{Z}_B$ (the measured loop impedance when the passive beacon is switched ON) are known. With a known $c_0/c_1$ magnitude ratio and the measured Fourier coefficient $c_1$, the delta impedance $\Delta \underline{Z}_{beacon}$ caused by the passive beacon can be calculated and the passive beacon response can be canceled in the input data of the FOD detection algorithm. Limitations to this time-differential mode impacts which scenarios the beacon cancellation is applicable, examples of which are described with respect to FIG. 18.

Figure 18:
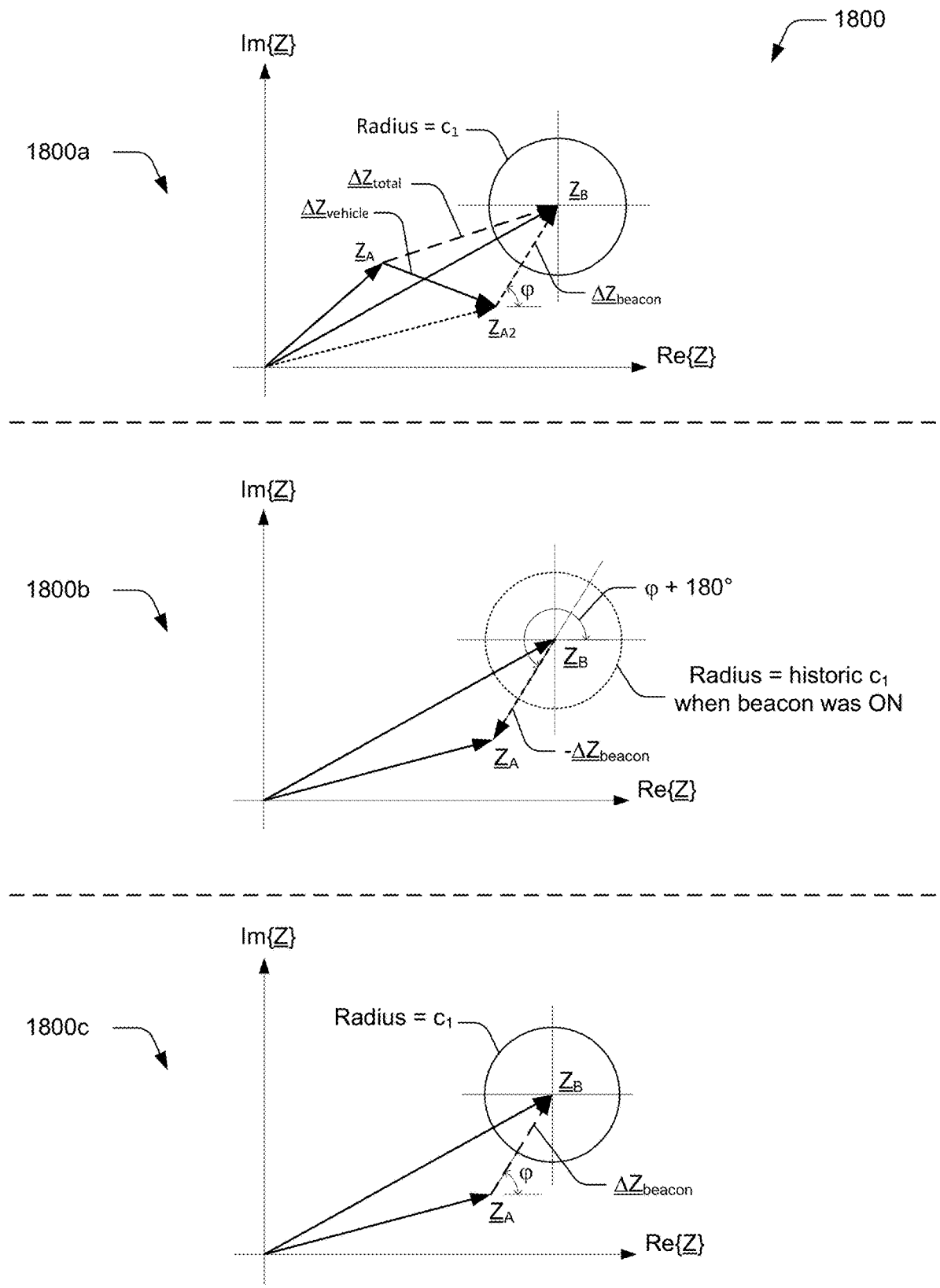
FIG. 18 illustrates example implementations for applying beacon cancellation.

FIG. 18 illustrates example implementations 1800 for applying beacon cancellation. FIG. 18 includes scenarios 1800a, 1800b, and 1800c. The scenario 1800a represents a vehicle approaching with the passive beacon switched ON. Here, a FOD response from the vehicle $\Delta Z_{vehicle}$ and the delta from the passive beacon $\Delta Z_{beacon}$ are superposed. Only the superposed response $\Delta Z_{total}$ can be seen in the FOD data.

In the scenario 1800a, the response from the passive beacon $\Delta Z_{beacon}$ may not be extractable on its own because a loop impedance caused by the vehicle $\underline{Z}_{A2}$ separate from the beacon cannot be measured (e.g., is unknown), hence the beacon cannot be canceled. However, it is not necessary to cancel the beacon because the FOD response due to the moving vehicle $\underline{\Delta Z}_{vehicle}$ is large and widespread. Also, the FOD response from the moving vehicle $\underline{\Delta Z}_{vehicle}$ cannot be compensated and the passive beacon adds another, relatively small, component on top of that. In the scenario 1800a, the FOD detection algorithm would not trigger a false alarm due to the raised threshold caused by the large response from the vehicle $\underline{\Delta Z}_{vehicle}$.

The scenario 1800b represents when the vehicle has stopped moving to start charging and the passive beacon is switched OFF. Switching the passive beacon OFF generates a step response in the FOD data with a negative sign but with the same magnitude as when switching the passive beacon ON. For the scenario 1800b, cancellation of the passive beacon avoids the FOD system triggering a false detection. Here, the following equation may be used to cancel the passive beacon:

$$\underline{Z}_A = \underline{Z}_B + (-\underline{\Delta Z}_{beacon}) \qquad \text{Equation 11}$$

The scenario 1800c represents the passive beacon being switched ON when the vehicle is stationary over the base power-transfer structure. Here, the system may validate that the vehicle power-transfer system is still aligned with the base power-transfer system. To do this, the passive beacon can be switched ON for a short time. Consequently, the passive beacon should be canceled, otherwise the FOD system would immediately trigger a false detection. To cancel the passive beacon, the following equation may be implemented:

$$\underline{Z}_B = \underline{Z}_A + \underline{\Delta Z}_{beacon} \qquad \text{Equation 12}$$

Figure 19:
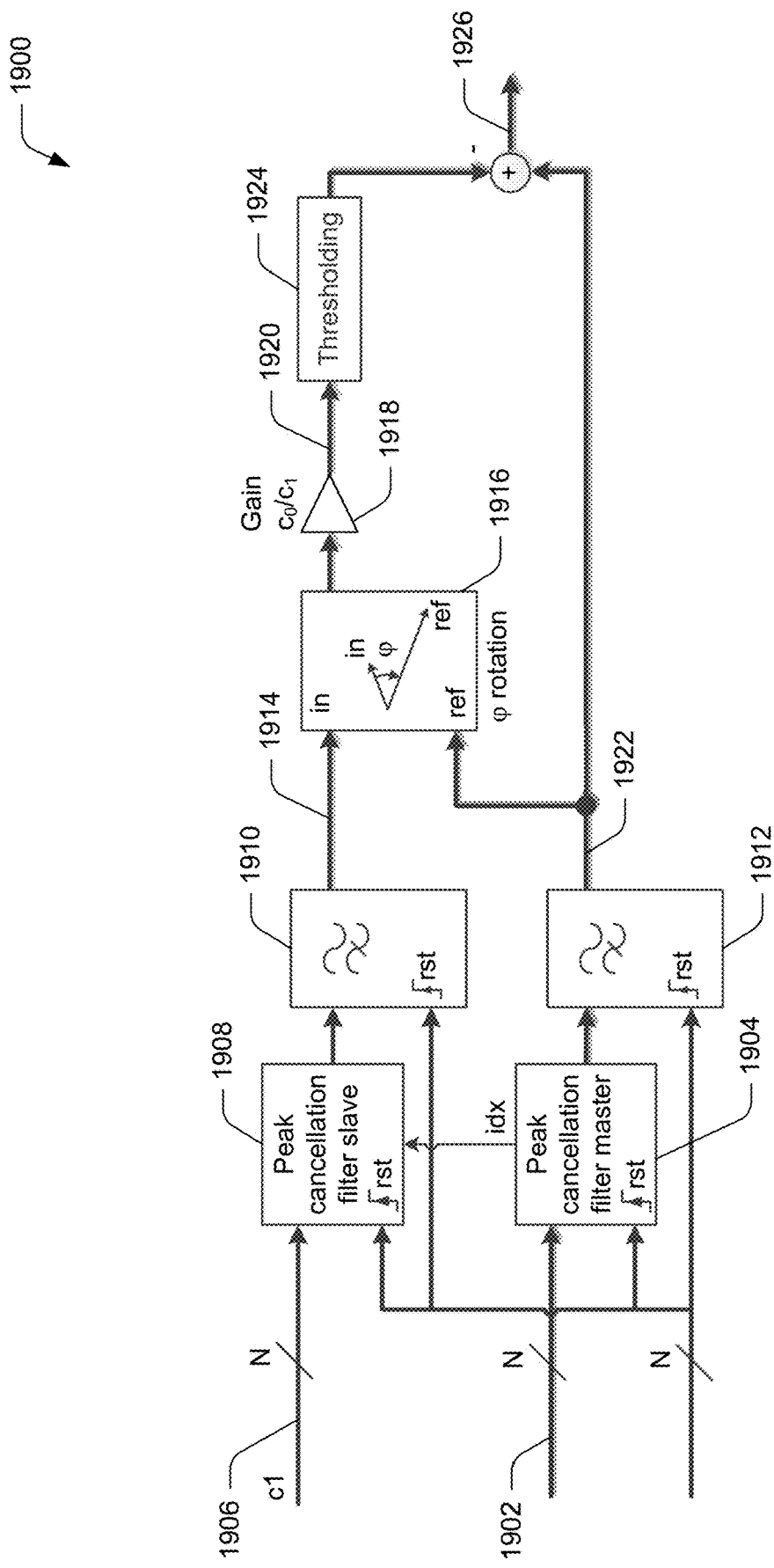
FIG. 19 depicts an example block diagram for passive beacon cancellation.
Figure 20:
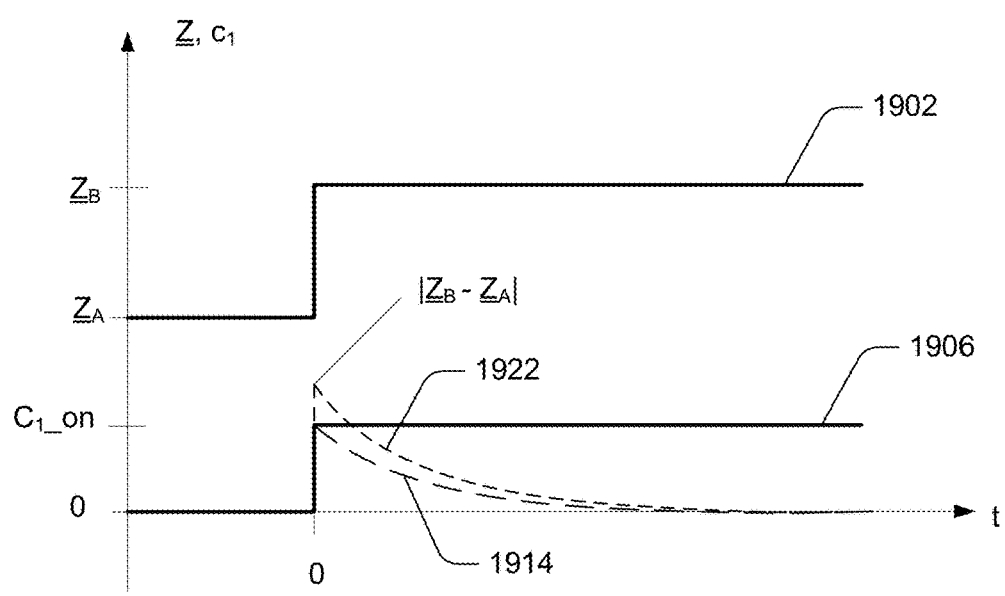
FIG. 20 illustrates example step responses of a passive beacon switch on at time zero.

FIG. 19 depicts an example block diagram 1900 for passive beacon cancellation. FIG. 20 illustrates example step responses 2000 of a passive beacon switched ON at time zero. The passive beacon cancellation may be applied to the scenarios 1800b and 1800c from FIG. 18 using a time differential approach. The equations below assume a step input as shown in FIG. 20.

The example block diagram 1900 illustrates an impedance 1902 of a specific FOD sense loop used as input to a peak cancellation filter master 1904. In addition, a passive beacon magnitude 1906 is used as input to a peak cancellation filter slave 1908. Outputs of the peak cancellation filter slave 1908 and the peak cancellation filter master 1904 pass to filters 1910 and 1912, respectively. The filters 1910 and 1912 may be high pass filters. An output 1914 of the filter 1910 may have various operations applied to it, such as a rotation 1916, a gain factor 1918, and a compensation signal 1920. At least a portion of an output 1922 of the filter 1912 may also be subject to the rotation 1916, the gain factor 1918, and the compensation signal 1920. The compensation signal 1920 may pass through thresholding 1924 to provide a cancellation signal that cancels at least a portion of the output 1922 of the filter 1912, which results in an overall output 1926.

It is assumed the passive beacon is switched ON at t=0, the impedance 1902 of a specific FOD sense loop jumps from $\underline{Z}_A$ to $\underline{Z}_B$ in the impedance plane, and the passive beacon magnitude 1906 (of the same FOD sense loop) jumps from zero to $c_1$, corresponding to scenario 1800c in FIG. 18.

The time differential FOD step response at an output 1922 of a high-pass filter 1912 is given by the following equation:

$$\underline{Z}_{td}(t) = (\underline{Z}_B - \underline{Z}_A) \cdot e^{-\frac{t}{\tau}} \qquad \text{Equation 13}$$

A time differential passive beacon step response $\Delta Z_{beacon\_td}$ (e.g., output 1922 of filter 1912) can be determined by applying the gain factor 1918, such as the ratio $c_0/c_1$, the rotation 1916, such as the rotation angle $\varphi$, and the compensation signal 1920. The following equation can be used to determine the time differential passive beacon step response $\Delta Z_{beacon\_td}$:

$$(\Delta Z)_{beacon\_td}(t) = c_1 \cdot \text{ratio}_{c_0/c_1} \cdot e^{j\varphi} \cdot e^{-\frac{t}{\tau}} \qquad \text{Equation 14}$$

For a complete cancellation, the compensation signal 1920 is equal to the output 1922 of the high-pass filter 1912, and the overall output 1924 becomes zero. In FIG. 20, the example step responses 2000 are illustrated for the scenario when the passive beacon is switched ON. Analog step responses are generated if the passive beacon is switched OFF. For the beacon cancellation, the two scenarios are equal. As shown in FIG. 20, the time differential step responses decay with a time constant $\tau$. As soon as the compensation signal 1920 magnitude falls below the threshold value, the compensation is stopped and the noise from the $c_1$ signal is not added to the output. In aspects, two identical peak cancellation filters may be used, one for the impedance and the other for the passive beacon magnitude. For the passive beacon cancellation to work properly, the two are coupled, e.g., working synchronously. Returning to FIG. 19, the peak cancellation filter master 1904 works on the impedance data, such as by cancelling incoming spikes. The peak cancellation filter slave 1908 buffers the same amount of input samples and picks the sample at the same buffer index that the peak cancellation filter master 1904 selected.

The peak cancellation filter master 1904 is implemented as a median filter for complex values. A median function is not defined for complex numbers. As a replacement, the sample with minimum absolute distance to the complex mean of all samples is selected as the output value.

Figure 21:
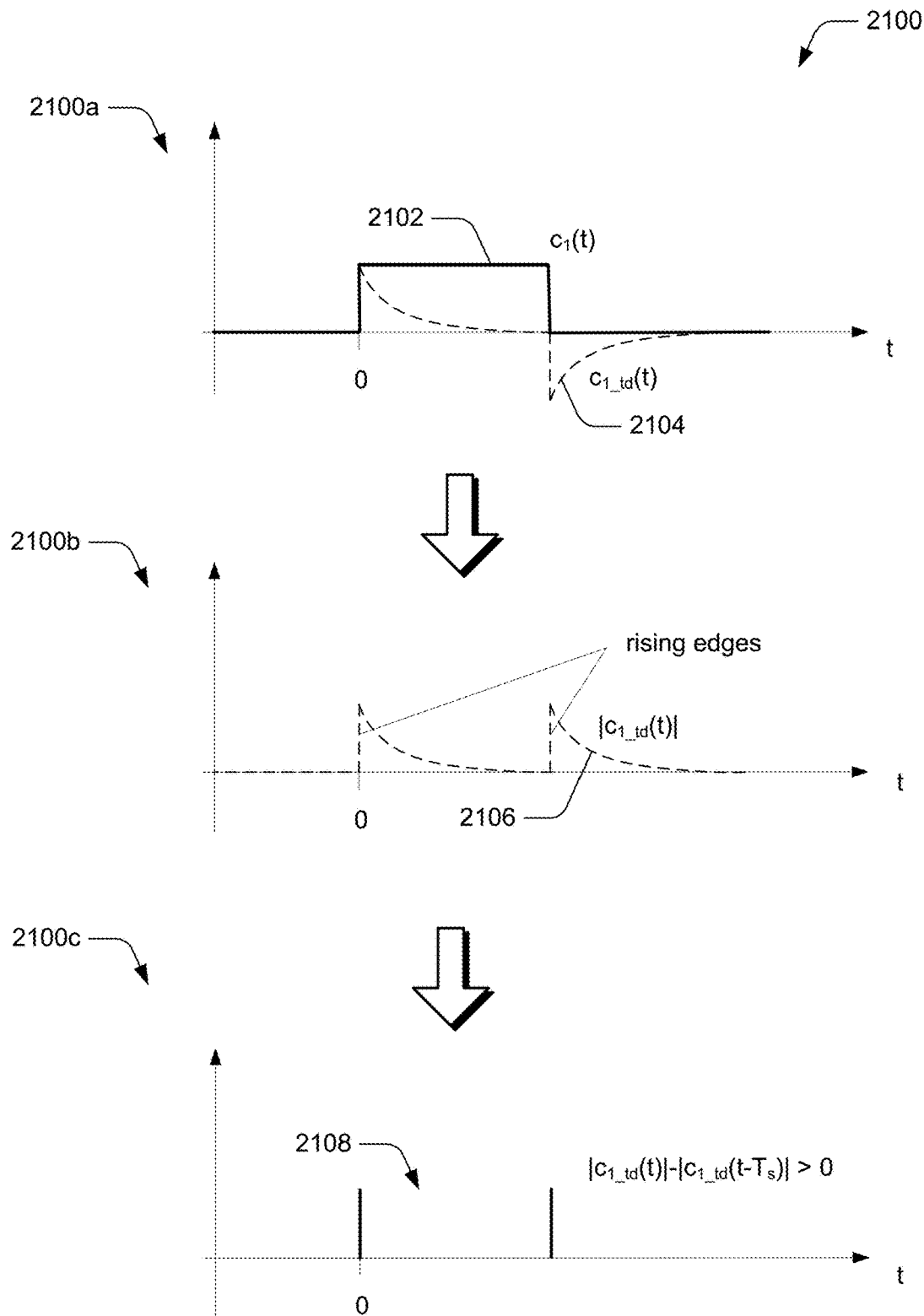
FIG. 21 illustrates an example implementation of a rotation angle calculation trigger.

FIG. 21 illustrates an example implementation 2100 of a rotation angle calculation trigger. The rotation angle $\varphi$ is calculated only in the moment of switching the passive beacon on or off. It is then held constant during the decay phase. In 2100a, the passive beacon magnitude 2102 $c_1$ and the time differential version 2104 $c_{1\_td}$ are shown when the passive beacon is switched ON and OFF. The trigger signal to calculate the rotation angle $\varphi$ is generated by a rising edge detector of the absolute value of the time differential passive beacon magnitude 2106 $|c_{1\_td}|$, as shown in 2100b. The trigger signal, shown as trigger signal 2108 in 2100c, may be represented by the following equation:

$$|c_{1\_td}(t)| - |c_{1\_td}(t-T_s)| > 0 \qquad \text{Equation 15}$$

In Equation 15, the term $T_s$, represents the sampling time, which can be any suitable sampling time.

In some implementations, the above mentioned $c_0/c_1$ ratio of the Fourier series may not be considered as a known constant but may be determined dynamically to achieve optimum beacon cancellation automatically. This releases the requirement of a very accurate and stable duty cycle of the modulation signal. A dynamic $c_0/c_1$ ratio for each FOD sense loop can be determined using Equation 16. The dynamic $c_0/c_1$ ratio can be updated by applying Equation 16 whenever the above mentioned rotation angle φ is calculated, using the same trigger signal given in Equation 15.

$$\text{ratio}_{c_0/c_1} = \frac{|Z_{td}|}{|c_{1\_td}|} \quad \text{Equation 16}$$

Example Wireless Power-Transfer System

Figure 22:
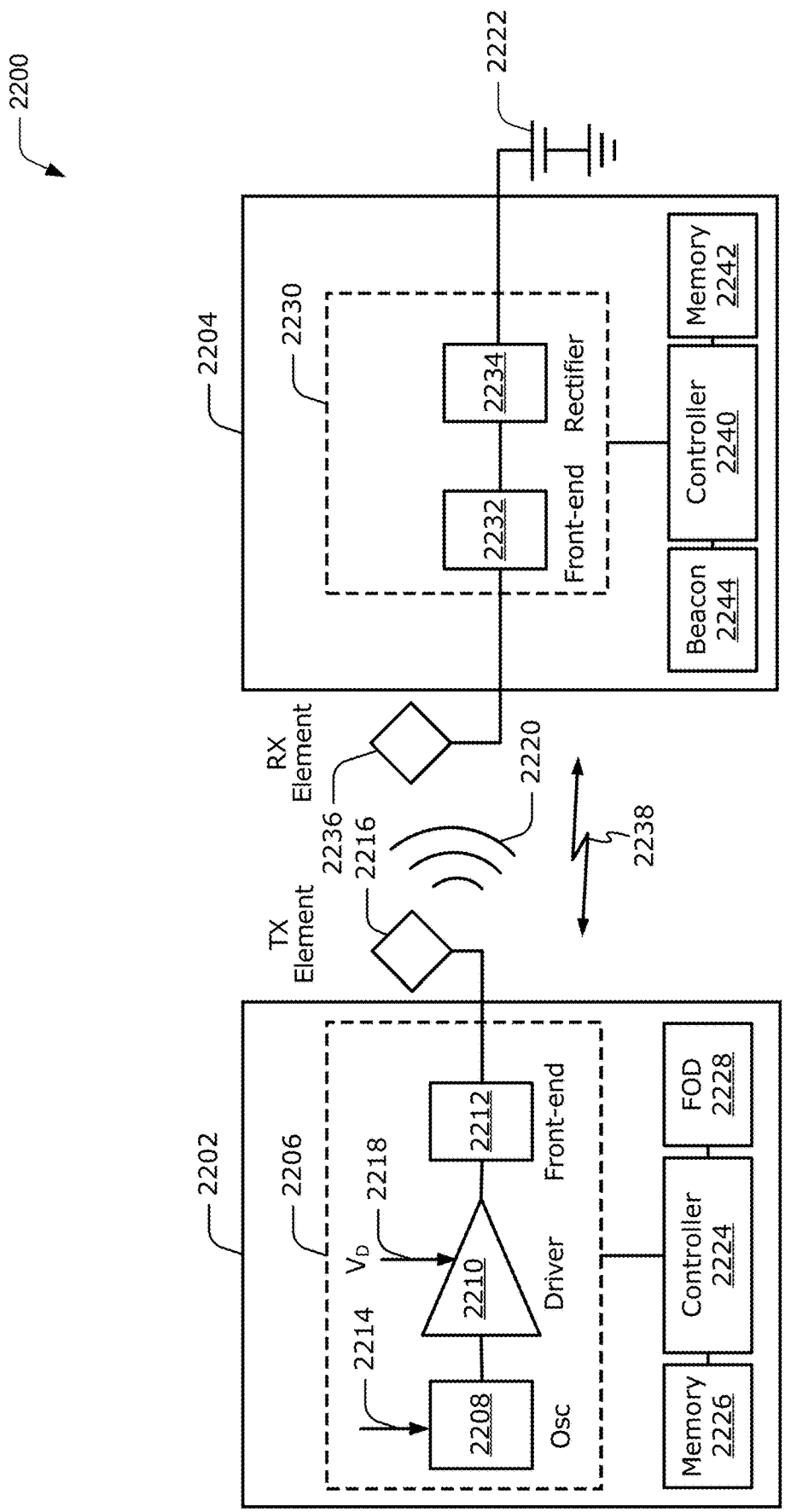
FIG. 22 illustrates an example wireless power-transfer system.

FIG. 22 illustrates an example wireless power-transfer system 2200, which includes components capable of implementing aspects of a hybrid foreign-object detection and positioning system. The system 2200 includes a transmitter 2202 and a receiver 2204. The transmitter 2202 may include transmit circuitry 2206 having an oscillator 2208 (e.g., inverter), a driver circuit 2210, and a front-end circuit 2212. The oscillator 2208 may be configured to generate an oscillator signal at a desired frequency that may adjust in response to a frequency control signal 2214. The oscillator 2208 may provide the oscillator signal to the driver circuit 2210. The driver circuit 2210 may be configured to drive the power transmitting element 2216 at, for example, a resonant frequency of the power transmitting element 2216 based on an input voltage signal ($V_D$) 2218. The driver circuit 2210 may be a switching amplifier configured to receive a square wave from the oscillator 2208 and output a sine wave.

The front-end circuit 2212 may include a filter circuit configured to filter out harmonics or other unwanted frequencies. The front-end circuit 2212 may include a matching circuit configured to match the impedance of the transmitter 2202 to the impedance of the power transmitting element 2216. The front-end circuit 2212 may include also a tuning circuit to create a resonant circuit with the power transmitting element 2216. As a result of driving the power transmitting element 2216, the power transmitting element 2216 may generate a wireless field 2220 to wirelessly output power at a level sufficient for charging a battery 2222, or otherwise powering a load.

The transmitter 2202 may further include a controller 2224 operably coupled to the transmit circuitry 2206 and configured to control one or more aspects of the transmit circuitry 2206, or accomplish other operations relevant to a hybrid foreign-object detection and positioning system. The controller 2224 may be a micro-controller or a processor. The controller 2224 may be implemented as an application-specific integrated circuit (ASIC). The controller 2224 may be operably connected, directly or indirectly, to each component of the transmit circuitry 2206. The controller 2224 may be further configured to receive information from each of the components of the transmit circuitry 2206 and perform calculations based on the received information. The controller 2224 may be configured to generate control signals (e.g., the control signal 2214) for each of the components that may adjust the operation of that component. As such, the controller 2224 may be configured to adjust or manage the inductive power transfer based on a result of the operations it performs. The transmitter 2202 may further include a memory 2226 configured to store data, for example, such as instructions for causing the controller 2224 to perform particular functions, such as those related to management of wireless power-transfer and/or foreign object detection and positioning.

The transmitter 2202 may also include a foreign object detection (FOD) circuit 2228. The FOD circuit 2228 is coupled to the controller 2224 and is configured to communicate with the controller 2224. The controller 2224 is configured to control the FOD circuit 2228. The FOD circuit 2228 may be coupled to one or more sensor circuits (not shown), such as FOD sense coils 618 of the FOD loop array 616 of FIG. 6b, which may detect a foreign object within the magnetic field of the wireless field 2220, such as a metal object, the electric vehicle 102 of FIG. 1, or the passive beacon 118 of FIG. 1, as described above. As described above, each sense coil 618 is configured to transmit a detection signal indicative of detecting the foreign object within its sensing area. The FOD circuit 2228 then communicates the detection signals to the controller 2224, which is configured to determine a position of the foreign object relative to one or more of the FOD sense coils based on the detection signals.

The receiver 2204 may include receive circuitry 2230 having a front-end circuit 2232 and a rectifier circuit 2234. The front-end circuit 2232 may include matching circuitry configured to match the impedance of the receive circuitry 2230 to the impedance of the power receiving element 2236. The front-end circuit 2232 may further include a tuning circuit to create a resonant circuit with the power receiving element 2236. The rectifier circuit 2234 may generate a DC power output from an alternating current (AC) power input to charge the battery 2222, or provide power to some other load. The receiver 2204 and the transmitter 2202 may additionally communicate on a separate communication channel 2238, e.g., Bluetooth™, ZigBee™, and cellular. The receiver 2204 and the transmitter 2202 may alternatively communicate via in-band signaling using characteristics of the wireless field 2220.

Further, the receiver 2204 may be configured to determine whether an amount of power transmitted by the transmitter 2202 and received by the receiver 2204 is appropriate for charging the battery 2222 or powering a load. In certain embodiments, the transmitter 2202 may be configured to generate a predominantly non-radiative field with a direct field coupling coefficient (k) for providing energy transfer. The receiver 2204 may directly couple to the wireless field 2220 and may generate an output power for storing or consumption by the battery 2222 (or load), coupled to the output of the receive circuitry 2230.

The receiver 2204 may further include a controller 2240 configured similarly to the transmit controller 2224 as described above for one or more wireless-power management aspects of the receiver 2204. The receiver 2204 may further include a memory 2242 configured to store data, such as instructions for causing the controller 2240 to perform particular functions, such as those related to a hybrid foreign-object detection and positioning system. The transmitter 2202 and receiver 2204 may be separated by a distance and configured according to a mutual resonant relationship to minimize transmission losses between the transmitter 2202 and the receiver 2204.

The power transmitting element 2216 and the power receiving element 2236 may correspond to or be included as part of, respectively, transmitter 104, the base power-transfer system 110, and/or the vehicle power-transfer system 114 that utilize techniques for a hybrid foreign-object detection and positioning system described herein.

The receiver 2204 may also include a beacon circuit 2244 coupled to the controller 2240 and to one or more antenna circuits (not shown). The controller 2240 is configured to control the beacon circuit 2244. The beacon circuit 2244 is configured to control the one or more antenna circuits, which may be referred to or configured as beacon loop antennas, such as the passive beacon 118 of FIG. 1 or an active beacon.

The beacon circuit 2244 may be integrated into the receive element 2236, or any other region of the electric vehicle 102 or the components thereof.

In an exemplary implementation, the controller 2240 is configured to control the beacon circuit 2244 by sending control signals to the beacon circuit 2244. The beacon circuit 2244 is configured to change electrical characteristics of the beacon loop antenna in response to the controller's 2240 control signals. For example, the beacon circuit 2244 can modulate, vary, or modify one or more electrical characteristics of the beacon antenna in response to the controller's 2240 control signals. In aspects, the beacon circuit 2244 can impart a distinctive modulation onto the electrical characteristic of the passive beacon 118, and the distinct modulation pattern may be used by the FOD circuit 2228 and controller 2224 to uniquely identify the passive beacon 118 from another foreign object, as described above.

The various illustrative logical blocks, modules, circuits, and method steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the described aspects.

The various illustrative blocks, modules, and circuits described in connection with the aspects disclosed herein may be implemented or performed with a general purpose hardware processor, a Digital Signal Processor (DSP), an Application-Specific Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the aspects disclosed herein may be embodied directly in hardware, in a software module executed by a hardware processor, or in a combination of the two. If implemented in software, the functions may be stored on or transmitted as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and Blu-ray™ disc where disks usually reproduce data magnetically, while discs reproduce data optically with lasers. Combinations of the above should also be included within the scope of computer-readable media. The hardware processor and the storage medium may reside in an ASIC.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus, the apparatus comprising:
one or more passive beacon circuits each comprising a beacon coil electrically connected to a capacitor to form a resonant circuit, the resonant circuit electrically coupled to an electronic device configured to vary an electrical characteristic of the passive beacon circuit as a function of a modulation signal, the electrical characteristic of the passive beacon circuit configured to be varied based on the modulation signal in a manner to cause a predetermined response at a foreign object detection (FOD) system of a wireless power transfer system, the predetermined response being characteristic of the passive beacon circuit and the modulation signal.

2. The apparatus of claim 1, wherein the one or more passive beacon circuits are located on a vehicle.

3. The apparatus of claim 1, wherein the predetermined response is usable to determine one or more of a position and orientation of a receive wireless power transfer structure relative to a transmit wireless power transfer structure.

4. The apparatus of claim 1, wherein at least one beacon coil of the one or more passive beacon circuits is inside a wireless power transfer structure comprising at least one inductive power transfer coil.

5. The apparatus of claim 4, wherein the at least one inductive power transfer coil is a circular-type coil.

6. The apparatus of claim 4, wherein the at least one beacon coil of the one or more passive beacon circuits is positioned, oriented, shaped, and configured to be substantially electromagnetically decoupled from the inductive power transfer coil.

7. The apparatus of claim 4, wherein the at least one beacon coil of the one or more passive beacon circuits is offset from a center of the inductive power transfer coil.

8. The apparatus of claim 4, wherein the at least one beacon coil of the one or more passive beacon circuits is a low profile planar coil integrated in a layer between an enclosure of the wireless power transfer structure and the inductive power transfer coil.

9. The apparatus of claim 4, wherein the at least one beacon coil of the one or more passive beacon circuits is a low profile planar coil integrated in a layer between a ferrite layer and the inductive power transfer coil.

10. The apparatus of claim 4, wherein a size of the at least one beacon coil of the one or more passive beacon circuits is configured for a target operating range of a distance between the at least one beacon coil and inductive sense coils of the FOD system.

11. The apparatus of claim 1, wherein a resonant frequency of the resonant circuit of the one or more passive beacon circuits is tuned to substantially a center of an operating frequency range of the FOD system.

12. The apparatus of claim 1, wherein the one or more passive beacon circuits include measures to protect the electronic device from high induced voltages.

13. The apparatus of claim 1, wherein the modulation signal is configured to reduce interference with the FOD system.

14. The apparatus of claim 13, wherein a fundamental magnitude of the modulation signal is substantially half of a frequency spacing of potential FOD operating frequencies.

15. The apparatus of claim 13, wherein a fundamental magnitude of the modulation signal is in a range from 1 kHz to 20 kHz.

16. The apparatus of claim 1, wherein the modulation signal is a periodic waveform having a modulation frequency.

17. The apparatus of claim 1, wherein the modulation signal is configured to enable the FOD system to uniquely identify and distinguish one or more of a beacon coil and a vehicle.

18. The apparatus of claim 17, wherein different modulation signals are used to support a pairing process of a wireless power receiver with a wireless power transmitter.

19. The apparatus of claim 1, wherein:
the electrical characteristic of the one or more passive beacon circuits includes an impedance state; and
the modulation signal causes the passive beacon circuit to toggle substantially between two distinct impedance states.

20. The apparatus of claim 19, wherein the two distinct impedance states of the one or more passive beacon circuits correspond to a resonant state and a non-resonant state.

21. The apparatus of claim 1, wherein:
the one or more passive beacon circuits are activated by applying the modulation signal; and
the one or more passive beacon circuits are temporarily activated when requested for determining the relative position.

22. The apparatus of claim 21, wherein the one or more passive beacon circuits are activated by one or more of a human machine interface, a vehicle ignition, a geofence system, and a vehicle-external trigger source via a communication link.

* * * * *